(12) United States Patent
Fukudome et al.

(10) Patent No.: US 6,359,150 B1
(45) Date of Patent: Mar. 19, 2002

(54) PHOTOCHROMIC COMPOUND AND OPTICAL FUNCTION DEVICE USING THE SAME

(75) Inventors: Masato Fukudome, Kyoto; Kazushi Kamiyama, Uji, both of (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/650,875

(22) Filed: Aug. 30, 2000

(30) Foreign Application Priority Data

| Aug. 31, 1999 | (JP) | 11-244194 |
| Nov. 26, 1999 | (JP) | 11-336817 |
| Mar. 27, 2000 | (JP) | 2000-087321 |

(51) Int. Cl.$^7$ ............. C07D 403/10; C07D 409/10; C07D 307/34
(52) U.S. Cl. ............. 549/59; 548/517; 548/524; 548/527; 549/472
(58) Field of Search ............. 548/517, 524, 548/527; 549/59, 472

(56) References Cited

U.S. PATENT DOCUMENTS

| 5,529,864 A |   | 6/1996 | Tachibana et al. |        |
| 6,100,292 A | * | 8/2000 | Matsumoto et al. | 514/443 |

FOREIGN PATENT DOCUMENTS

| EP | 0-433901  | 6/1991 |
| EP | 0-698605  | 2/1996 |
| JP | 10-060424 | 3/1998 |

OTHER PUBLICATIONS

Database WPI –XP–002171239 –Derwent Publications Ltd., London, GB Section Ch, Week 199631.
Database WPI –XP–002171240 –Derwent Publications Ltd., London, GB, Section Ch, Week 199536.
Database WPI –XP–002171241 –Derwent Publications Ltd., London, GB, Section Ch, Week 199721.
Database WPI –XP–002171242 –Derwent Publications Ltd., London, GB, Week 197619.

* cited by examiner

Primary Examiner—Floyd D. Higel
Assistant Examiner—Sonya Wright
(74) Attorney, Agent, or Firm—Hogan & Hartson, L.L.P.

(57) ABSTRACT

A novel diarylethene photochromic compound is provided. The photochromic compound is capable of forming an amorphous thin film by itself through a coating method and has an excellent thermostability. The amorphous thin film of the photochromic compound can exhibit a large refractive index between the isomers of the photochromic compound. Thus, using such an amorphous thin film provides an optical function device suitable for an optical memory device and an optical switching device.

8 Claims, 13 Drawing Sheets

STEP 1:

STEP 2:

STEP 3:

STEP 4:

(21)

STEP 2:

STEP 3:

STEP 4:

(23)

PHOTOCHROMIC COMPOUND AND OPTICAL FUNCTION DEVICE USING THE SAME

BACKGROUND OF THE INVENTION

1. Field of the Invention

The present invention relates to a novel photochromic compound and an optical function device using the same. To be more specific, it relates to a novel photochromic compound that is based on a diarylethene structure and capable of forming an amorphous thin film by itself, and an optical function device suitable for optical storage and switching.

2. Description of the Prior Art

As indicated in the following formula, photochromic compound means a molecule or molecule aggregation capable of transforming reversibly between two different forms, i.e., isomers A and B, in response to light irradiation. In other words, as shown in the following formula, isomer A changes, i.e., isomerizes, into isomer B by irradiation of light having a wavelength of $\lambda_1$, and isomer B retransforms into isomer A by irradiation of light having a wavelength of $\lambda_2$.

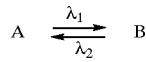

Since isomers A and B show different optical properties such as absorptivity, refractive index, optical rotatory power and permittivity, the above-mentioned reversible optical response phenomenon makes it possible to apply the compound to a memory material. In a specific case of using the compound for a memory, information can be recorded through transformation of isomer A into isomer B by irradiation of light having a wavelength ($\lambda_1$). The recorded information can be read based on the difference of optical properties including absorbance and refractive index between the two isomers (i.e., isomers A and B). Moreover, the recorded information can be erased through retransformation of isomer B into isomer A by irradiation of light having another wavelength ($\lambda_2$).

To use the photochromic compound for optical recording including an optical memory, it is required for the photochromic compound; 1) to be an excellent in storage of information, that is, the isomers of the compound, A and B, have excellent thermal and chemical stabilities; 2) to have an excellent durability against repeating operations of writing and erasing, that is, the above-mentioned reversible reaction can be performed repeatedly: 3) to have a large difference in refractive index or absorbance between the isomers A and B sufficient to obtain a high C/N ratio reading signal; and 4) to form a thin film easily.

As the photochromic compound excellent in thermostability and durability against repeating its isomerization, diarylethene derivatives have been studied in recent years. The diarylethene derivatives undergo ring-opening and ring-closing reactions, as shown in the following formula, to be colored and bleached respectively. In addition, both of isomers, i.e., the open-ring and closed-ring forms, of the diarylethene derivatives are thermally stable.

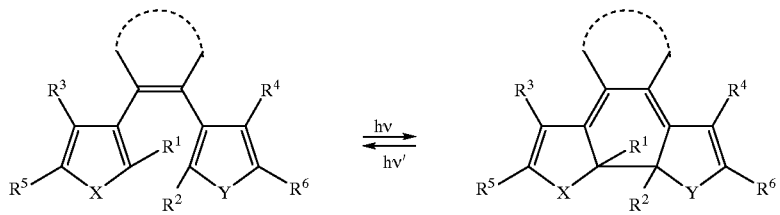

In known derivatives shown in the above formula, X and Y are respectively one of oxygen atom, sulfur atom and nitrogen atom of secondary or tertiary amine; $R^1$ and $R^2$ are each alkyl group; $R^3$, $R^4$, $R^5$ and $R^6$ are each one selected from a group consisting of alkyl group, alkoxyl group and hydrogen atom.

It is inevitable for the conventional photochromic compound based on diarylethene derivatives to be dispersed into a polymer matrix such as polymethylmethacrylate and polystyrene in order to form a thin film. Such a photochromic compound thin film needs to show large changes in absorbance and refractive index between the isomers of the compound enough to obtain a reading signal having a high C/N ratio. It is therefore important to increase molecular density of the photochromic compound contained in the film. However, no more than 30 parts by weight of the photochromic compound can uniformly disperse into 100 parts by weight of the polymer matrix because of the mutual-solubility between the photochromic compound and the polymer matrix, resulting in obtaining a thin film having poor properties. Therefore, it has been desired to develop a photochromic compound that is capable of forming a thin film by itself.

M. Irie, Chem. Lett. 899(1995) and Japanese Unexamined Patent Publication No. 8-119963 disclose a photochromic compound capable of forming a thin film by itself without using a polymer matrix. In the disclosure, the photochromic compound is deposited to a substrate to form a crystallized film of the photochromic compound. Such a formation of the thin film through vapor deposition, however, is disadvantageous in a mass-production. For the mass-production of the film, it has been desired to form the photochromic compound thin film by a coating method including spin coating.

Japanese Unexamined Patent Publication No. 9-241254 discloses a photochromic compound capable of forming a thin film without using a polymer matrix and, in addition, through a coating method, e.g., spin-coating. This reference proposes a photochromic compound in which at least one of the hetero-cyclic aryl groups constituting diarylethene derivative has an adamanthyl group. The photochromic compound can exhibit an amorphous solid state by itself without using a polymer matrix. In addition, it can form a thin film having the photochromic compound by itself through a coating method such as spin coating. However, this reference fails to disclose optical properties, e.g., refractive index, and thermostability of the compound. It is thus unknown whether the compound has favorable properties sufficient to be practically used for an optical recording device.

Jpn. J.Appl. Phys.38 (1999) L119 also discloses diarylethene photochromic compound that is capable of forming a thin film by itself. This compound, however, has a low glass transition temperature of about 70° C. Thus, it is impossible to use the compound for an optical function device which requires a practical thermostability.

SUMMARY OF THE INVENTION

It is an object of the present invention to provide a photochromic compound capable of forming an amorphous thin film by itself without dispersing in a polymer resin matrix. The photochromic compound also can exhibit a large change of its optical properties such as absorbance and refractive index between before and after light irradiation. Furthermore, it is excellent in thermo- and chemical-stabilities, since it has a glass transition temperature of greater than 100° C. It is another object of the present invention to provide an optical function device using the photochromic compound.

The inventors have found the followings. A volumed substituent bound to a hetero-cyclic aryl group constituting a diarylethene skeleton of a photochromic compound makes it possible to form an amorphous thin film made of the photochromic compound by itself. In addition, using a substituent having at least three aryls as the volumed substituent makes it possible to give an excellent thermostability, i.e., a glass transition temperature of greater than 100° C., to the photochromic compound, to complete the present invention.

According to the preset invention, provided is a diarylethene photochromic compound shown in the following formulas (1) and (2), in which $R^5$ and $R^6$ are each organic group having at least three aryls.

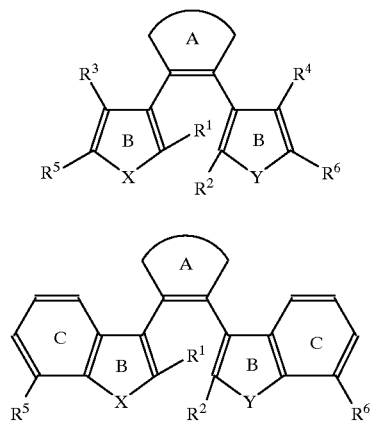

In the above formulas, ring B is a hetero-cyclic aryl group selected from a group consisting of furan, thiophene and pyrrole; ring A is at least one selected from a group consisting of alicyclic group, aromatic ring, maleic anhydride and maleimide group; ring C is a benzene ring or its derivatives; $R^1$ and $R^2$ are each one of hydrogen atom and an alkyl group having 1 to 6 carbon atoms, and they may be same or different from each other; and $R^3$ and $R^4$ are each one selected from a group consisting of hydrogen atom, an alkyl group having 1 to 6 carbon atoms, cyano group, aryl group, halogen atom, nitro group, amino group and alkoxyl group, and they may be same or different from each other.

According to the preset invention, also provided is an optical function device suitable for an optical memory using the above-mentioned photochromic compound according to the present invention. The optical function device comprises a substrate; and an amorphous thin film layer made of the above-mentioned photochromic compound provided on the substrate.

The preset invention further provides an optical function device suitable for an optical switching using the above-mentioned photochromic compound according to the present invention. The optical function device comprises a translucent substrate, a transparent plastic layer provided on the substrate; a first and a second optical waveguides formed inside the transparent plastic layer, each of which has a first and a second branch sections for branching light passing through the first and second optical waveguides. The photochromic compound thin film according to the present invention is used as a clad layer on the first optical waveguide between the first and the second branch sections thereof.

The term "Aryl" in this specification means a cyclic group having aromaticity that has a π electron in accordance with the Huckel's rule. The cyclic compounds include benzene ring, condensed ring, hetero ring and derivatives of these.

These and other objects, features and advantages of the invention will become more apparent upon reading the following detailed description.

DETAILED DESCRIPTION OF THE PREFERRED EMBODIMENTS OF THE INVENTION

Figure 1:
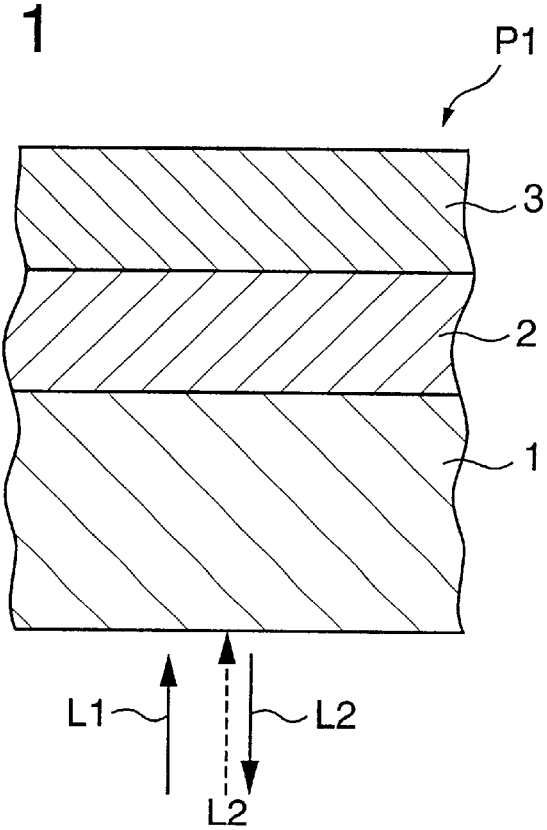
FIGS. 1 to 3 are sectional views illustrating optical function devices suitable for an optical memory in embodiments of the present invention.

The photochromic compound according to the present invention is a compound having diarylethene skeleton shown in formula (1) or (2). Formula (1) shows a photochromic compound based on diarylethene derivative having ring A and hetero ring B, and formula (2) shows a photochromic compound based on a diarylethen derivative having ring A, hetero ring B and aromatic ring C conjugated with hetero ring B.

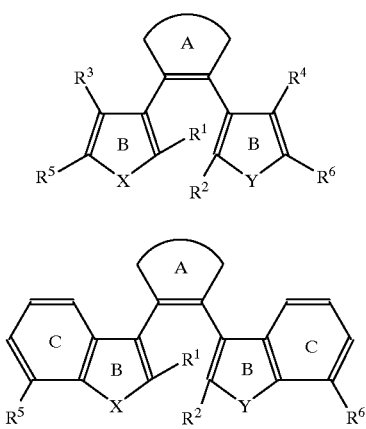

In the above formulas, ring B is a five-ring having a hetero atom; X and Y are respectively one of oxygen atom (in case where ring B is furan), sulfur atom (in case where ring B is thiophene) and NR (N: nitrogen atom; R: hydrogen atom or alkyl group) which makes ring B to be pyrrole. Though X and Y may be same or different from each other, preferably they are same. Also, in the most preferable case, ring B is thiophene. This is because the obtained open-ring form of the photochromic compound in this case has the highest thermostability.

Ring C is a benzene ring or its derivative. The derivative includes compounds in which a part or all of hydrogen atoms are substituted by alkyl group, halogen atom, amino group, carboxyl group, cyano group, phenyl group or the like.

Ring A is alicyclic group, aromatic ring, anhydride or maleimide group. In case where ring A is alicyclic group, it is preferably four- to seven-ring. The alicyclic group is not limited to an alicyclic hydrocarbon, and may be a group where a halogen atom may substitute a part or all of the hydrogen atoms of the alicyclic hydrocarbon. The preferable halogen atom is fluorine atom. This is because, in the process for synthesizing the photochromic compound, the substituted fluorine atom gives the compound an excellent reactivity and an increased yield. Specifically, ring A may be maleic anhydride as shown in formulas (3)-1 or (3)-2; maleimide as shown in formulas (4)-1 or (4)-2; perfluorocyclopentylidene as shown in formulas (5)-1 or (5)-2 and the like. Of these, perfluorocyclopentylidene is most preferable.

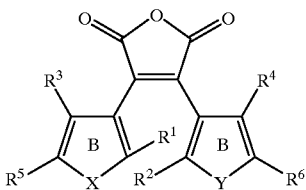

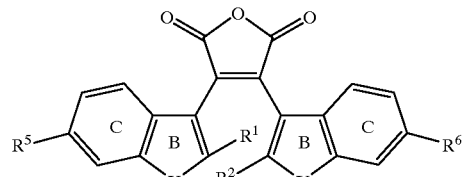

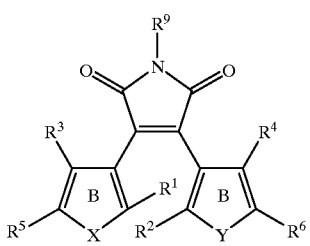

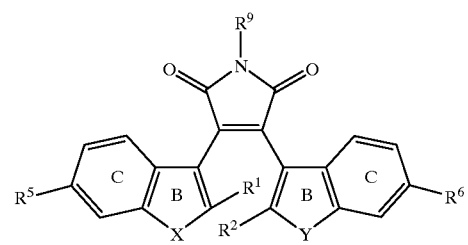

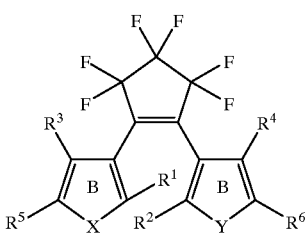

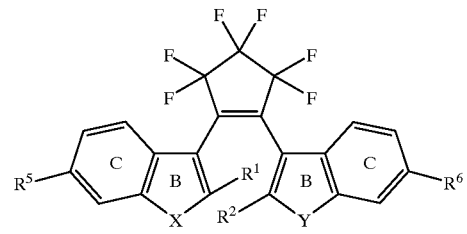

$R^1$ and $R^2$ in the formulas (1) to (5) are each one of hydrogen atom and an alkyl group having 1 to 6 carbon atoms, and they may be same or different from each other. $R^3$ and $R^4$ in the formulas (1), (3)-1, (4)-1 and (5)-1 are each one of hydrogen atom, an alkyl group having 1 to 6 carbon atoms, cyano group, aryl group, halogen atom, nitro group, amino group or alkoxyl group, and they may be same or different from each other. $R^9$ in the formula (4)-1 and (4)-2 is hydrogen atom, an alkyl group having 1 to 6 carbon atoms, cyano group, aryl group, halogen atom, nitro group, amino group or alkoxyl group.

$R^5$ and $R^6$ in the formulas (1) to (5) are each organic group containing three aryls, i.e., an organic group in which three aryls (Ar) is bound to atom Z having a valence of more than 3. The three aryls-contained organic group in case of atom Z having a valence of 3 is shown in formula (6) and that in case of atom Z having a valence of 4 is shown in formula (7).

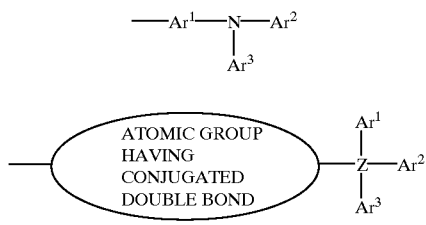

In the above formulas, each of aryls, $Ar^1$, $Ar^2$, and $Ar^3$ is benzene ring such as phenyl, condensed ring such as naphthyl, hetero ring such as pyridyl or derivatives of these. The aryls may be same or different from each other. The derivatives may be an aryl in which a part or all of hydrogen atoms of the aromatic ring or hetero ring is substituted by at least one selected from a group consisting of alkyl group, aryl group, halogen atom, nitro group, alkoxy group and ciano group.

The tertiary atom Z includes an atom having a valence of 3 such as nitrogen atom and phosphorus atom; and an atom having a valence of 4 such as carbon atom and Si atom. Of these, nitrogen atom is preferred. In this case, a large molar absorption coefficient of the photochromic compound can be obtained because of the interaction between the electron-attracting ability due to the nitrogen atom and the electron-donating ability due to the diarylethene skeleton.

In case that atom Z having a valence of 3, one of aryl groups bound to atom Z may be bound to ring B or ring C directly or through atomic group having conjugated double bond. In case that atom Z having a valence of 4, atom Z may be bound to ring B or ring C with using the remaining bond of atom Z that has no aryl group through an atomic group having conjugated double bond.

The atomic group having conjugated double bond between three aryls-contained group and ring B or ring C extends the conjugated system in the photochromic compound molecule, thereby shifting the maximum absorption wavelength of the bleached isomer (open-ring form) of the compound to the long-wave side. This makes it possible not only for ultraviolet light but also for a semiconductor laser such as blue light to isomerize the compound from the open-ring form into the closed-ring form of the compound. That is, an ultraviolet laser can be replaced with a blue semiconductor laser for such an isomerization, resulting in decreasing the size of the obtained optical function device.

Examples of the atomic group having conjugated double bond include monoene (in case of m=1 in the following formula); and diene (in case of m=2 in the following formula), phenylene group and biphenyl group

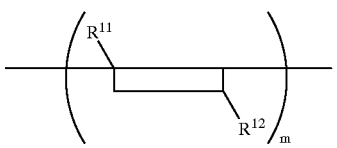

In the above formula, $R^{11}$ and $R^{12}$ are respectively one of hydrogen atom and an alkyl group having 1 to 6 carbon atoms, and they may be same or different from each other.

As the phenylene group, used may be o-, m- or p-phenylene. Of these, p-phenylene is most preferable, because the p-substitution product can suppresses crystallization speed of the compound more effectively than that of the other substitution products.

The photochromic compound having the above-mentioned chemical structure can exhibit a photochromic reaction, resulting from its diaryl structure. It also can form a stable amorphous solid state by itself without dispersing into a polymer matrix, because the volumed group containing three aryls in the compound acts to suppress the crystallization speed.

Moreover, after repeating such an optical reversible reaction, i.e., photochromic reaction, between open- and closed-ring forms in response to light irradiation, the optical properties of the compound is hardly deteriorated. Furthermore, both of colored and bleached isomers of this compound are thermally stable and thermally irreversible, since both of them respectively have a high glass transition temperature of more than 100° C. It has been reported that, a photochromic compound in which a hetero ring B has an alkylamino group (a group having nitrogen atom bound with an alkyl group) shows poor durability and stability. On the other hand, the photochromic compound according to the present invention in which a hetero ring B has a group containing three aryls (e.g. triarylamino group) shows an excellent durability against repeating the photochromic reactions, which is capable for practical use.

A general process for synthesizing the photochromic compound having above-mentioned chemical structure is explained in the followings, but not limited thereto.

STEP(a) : BROMINATION

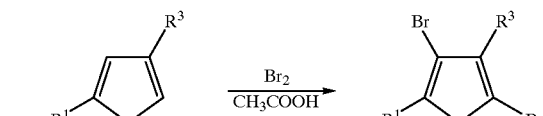

STEP(b) : BOUND TO A THREE ARYLS-CONTAINED GROUP

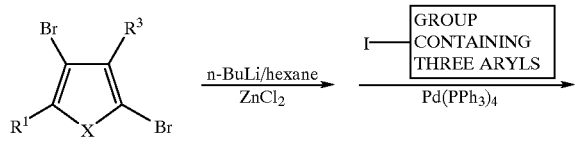

-continued

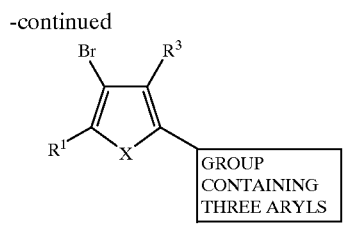

STEP(c) : BOUND TO RING A

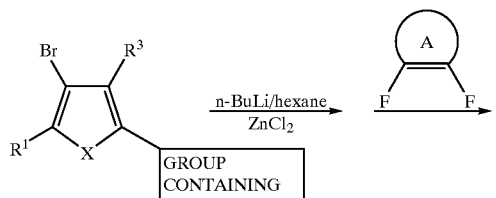

STEP(c) : BOUND TO RING A

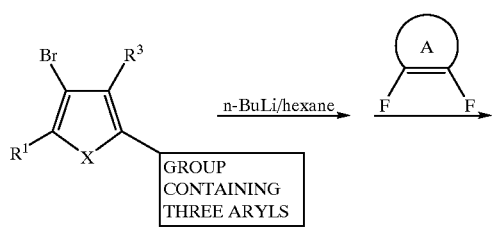

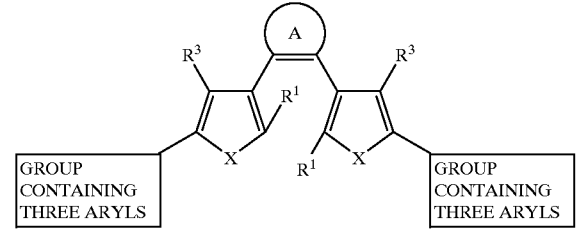

A hetero ring substituted by dibromine is obtained through the reaction between a heterocyclic compound, corresponding to ring B, and bromine (step (a): bromination). The obtained dibromin-substituting hetero ring is caused to react with zinc chloride to obtain a zinc compound. Subsequently, the zinc compound is further caused to react with a compound having a group containing three aryls bound to iodine. Consequently, obtained can be a compound in which one bromine atom of the dibromine-substituting hetero ring is substituted by the group containing three aryls (step (b): bound to a three aryls-contained group). In the process of step (b), palladium catalyst is preferably used. Then, the monobromine-substituting hetero ring that has a three aryls-contained group obtained from step (b) is caused to react with butyllithium to undergo lithium-halogen exchange, thereby generating an anion of a three aryls-contained group. The generated anion is then caused to react with a ring A compound having halogenated ethene, to obtain a photochromic compound having the three aryls-contained group bound to diarylethene skeleton (step (c): bound to ring A).

The above-mentioned method starts with dibromination, followed by exchanging one of the bromines with a group containing three aryls, and then exchanging the other bromine with ring A. Another method for synthesizing the photochromic compound is shown in the following formulas, which starts with synthesizing hetero ring B having a group containing three aryls, followed by iodization of 3-position of ring B, and then exchanging the iodine with ring A.

STEP(d) : BOUND TO A THREE ARYLS-CONTAINED GROUP

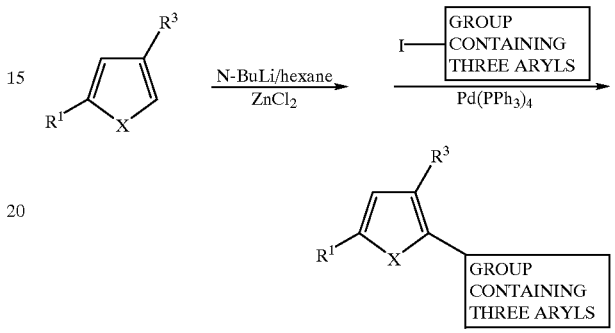

STEP(e) : IODIZATION

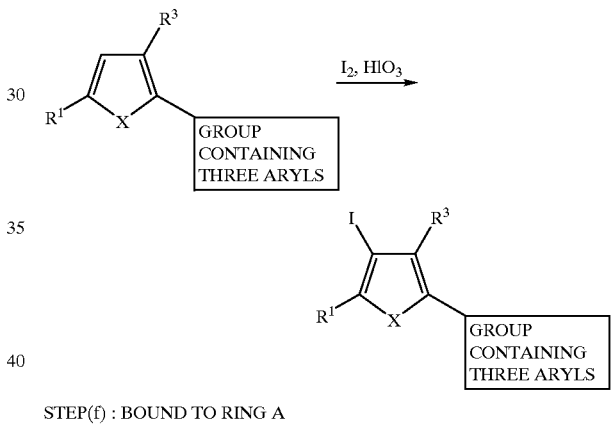

STEP(f) : BOUND TO RING A

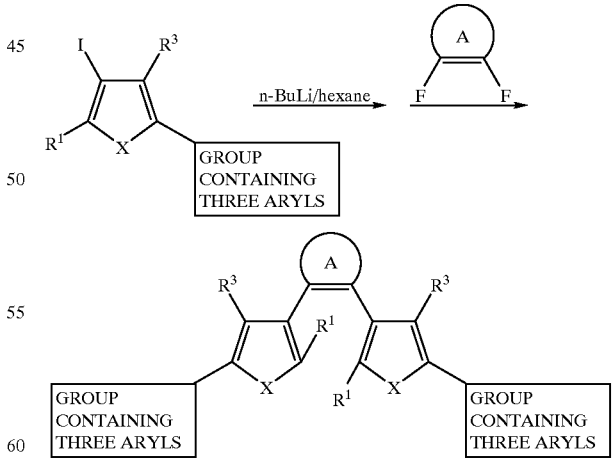

In step (d), a solution containing ring B, n-BuLi and zinc chloride is mixed with an iodide of a group containing three aryls, to produce ring B having a three aryls-contained group. In step (e), 3-position of the produced ring B having a three aryls-contained group is iodized. In step (f), the iodine bound to ring B is caused to exchange with ring A, to obtain an objective photochromic compound.

In case of synthesizing a photochromic compound having conjugated double bond between its diarylethene skeleton and a three aryls-contained group, used as the iodide of a group containing three aryls can be a compound in which a conjugated double bond is bound between a three-aryls contained group and iodine.

Specifically, preferable photochromic compounds according to the present invention are as follows.

Formula (11) represents a photochromic compound produced by using, as the three aryls-contained group, an organic group in which three aryl groups are bound to a nitrogen atom and then causing the organic group to be bound to the diarylethene skeleton directly without having a conjugated double bond therebetween. Formula (12) represents a photochromic compound in which a three aryls-contained group (i.e., a group having three aryls bound to a nitrogen atom) is bound directly to ring C of the diarylethene skeleton.

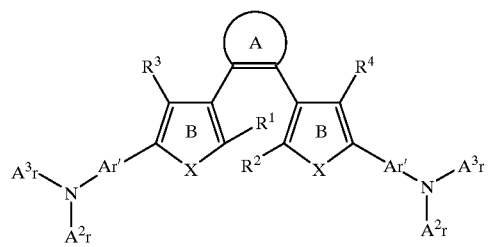

(11)

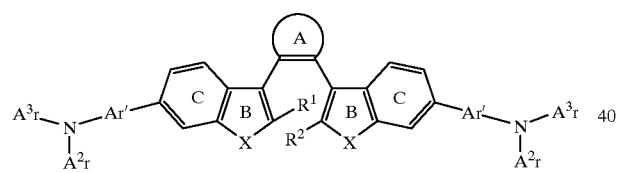

(12)

In the above formulas, ring A is alicyclic group, aromatic ring, anhydride or maleimide group, as is the case with ring A in formulas (1) to (5). When ring A is an alicyclic group, preferably it is four-to seven-ring. A part or all of hydrogen atoms of the alicyclic group may be substituted by halogen atoms.

Ring B of the formulas is a hetero ring selected from a group consisting of furan, thiophene and pyrrole.

Ring C of the formulas is a benzene ring or its derivatives. The derivatives include compounds in which a part or all of hydrogen atoms of the benzene ring are substituted by alkyl group, halogen atom, amino group, carboxyl group, cyano group, phenyl group or the like $R^1$ and $R^2$ in formulas (11) and (12), as is the case with those in formulas (1) to (5), are respectively one of hydrogen atom and an alkyl group having 1 to 6 carbon atoms, and they may be same or different from each other. $R^3$ and $R^4$ in formulas (11) and (12), also as is the case with those in formulas (1) to (5), are respectively one selected from a group consisting of hydrogen atom, an alkyl group having 1 to 6 carbon atoms, cyano group, aryl group, halogen atom, nitro group, amino group and alkoxyl group, and they may be same or different from each other.

Each of aryls, $Ar^1$, $Ar^2$ and $Ar^3$ in formulas (11) and (12), as explained with respect to formulas (6) and (7), is benzene ring, condensed aromatic ring, hetero ring or derivatives of these. The aryls may be same or different from each other.

The preferable examples of the photochromic compounds shown in formulas (11) and (12) are represented by formulas (13) and (14) respectively.

(13)

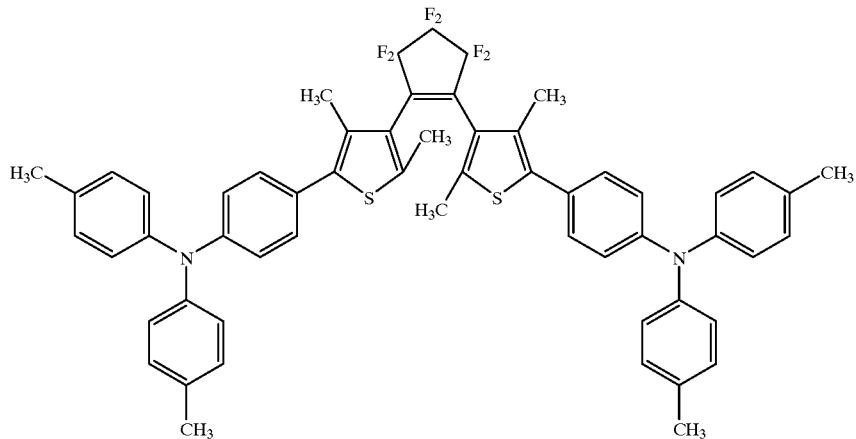

(14)

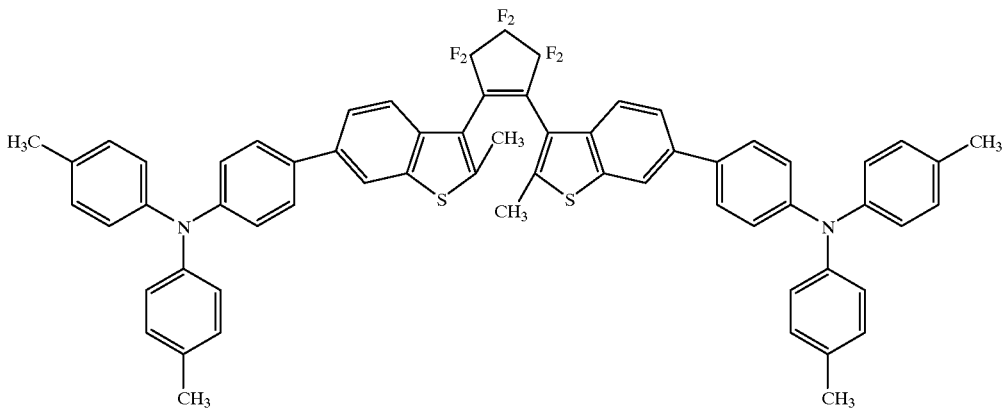

Both of the above open-ring forms can isomerize to their closed-ring forms by irradiation of 350 nm or less ultraviolet light, and then retransform to the open-ring form by irradiating visible light of 450 nm or more. In addition, the amorphous thin films each formed exclusively by the above compound can undergo isomerization from the open-ring form to the closed-ring form by irradiating blue light of about 400 nm besides ultraviolet light. In such a case that the amorphous thin films are formed exclusively by the compounds shown in formulas (13) and (14), since degree of freedom of the three aryls-contained group is restrained within the thin film, an angle between one plane of one hetero ring and the other plane of the other hetero ring decreases in such manner that these planes approach to the same plane to allow π electron to conjugate as far as the three aryls-contained group. It is thereby considered that the absorption wavelength of open-ring form shifts to the long-wave side. In addition, the compounds have an extremely high isomerization rate of nearly 100%. The reason is considered as follows. The tertiary nitrogen atom has an electron attracting ability due to its unpaired electron, while ring A has an electron donating ability. This results in a charge transfer between the nitrogen atom and ring A, to stabilize the isomers. Furthermore, any of open- and closed-ring forms has a glass transition temperature of more than 100° C., thereby being thermally stable.

Another preferable examples of photochromic compounds according to the present invention are shown in formulas (15) and (16). Each of the compounds has an atomic group having a conjugated double bound with triphenylamine as $R^5$ and $R^6$ respectively in the above-mentioned general formulas. Formula (15) represents a photochromic compound in which the atomic group having a conjugated double bond is bound between the diarylethene skeleton and triphenylamine, and formula (16) represents a photochromic compound in which the atomic group having a conjugated double bond is bound between the diarylethene skeleton having ring C and triphenylamine.

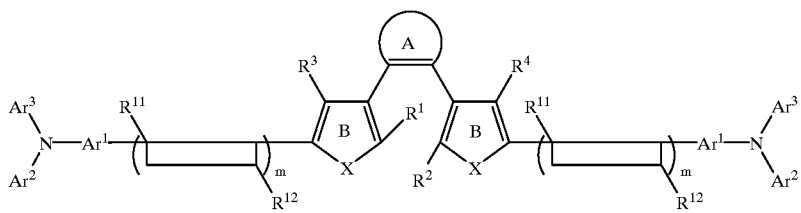

(15)

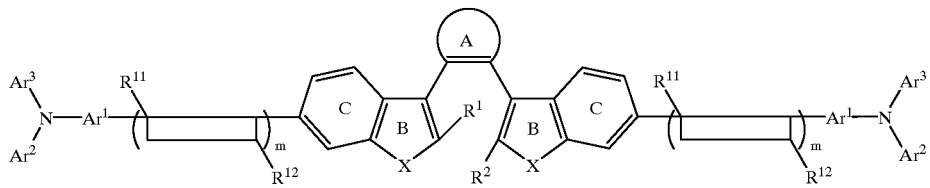

(16)

In the above formulas, $Ar^1$, $Ar^2$, $Ar^3$, $R^1$ and $R^2$ are similar to respective ones in formulas (11) and (12).

$R^{11}$ and $R^{12}$ in formulas (15) and (16) are each one selected from a group consisting of hydrogen atom and an alkyl group having 1 to 6 carbon atoms, and they may be same or different from each other.

Such a photochromic compound, as shown in formulas (15) and (16), that includes a group having a conjugated double bond between the diarylethene skeleton and triphenylamine, has an extended conjugated system in the photochromic compound molecule, resulting in shifting the maximum absorption wavelength of open-ring form to the long-wave side. Consequently, even light of more than 400 nm can induce the isomerization to the closed-ring form.

These compounds can be synthesized in the same way as the above-mentioned method, except for using the following iodine compound having three aryls as the compound having group three aryls in step (b) or (d).

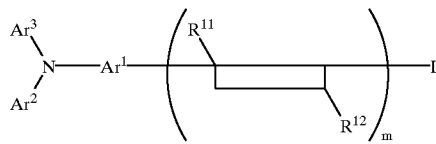

Further preferable examples of the photochromic compounds according to the present invention are shown in formulas (17) and (18). Each of the compounds has an atomic group having a conjugated double bond with triphenylamine as $R^5$ and $R^6$ respectively in the above-mentioned general formulas. Formula (17) represents a photochromic compound in which the carbon atom having three aryls is bound to the diarylethen structure through a conjugated double bond of 1 or more than 2 phenylen groups. Formula (18) represents a photochromic compound in which the carbon atom having three aryls is bound to the diarylethen structure having ring C through a conjugated double bond of 1 or more than 2 phenylen groups.

addition, the presence of the phenylene group, i.e., the presence of a conjugated double bond, can shift the wavelength for the ring-closing reaction to the long-wave side, and, consequently, even light of more than 400 nm in wavelength can induce the isomerization reaction.

The photochromic compounds can be synthesized in the same way as step (b) or (d) of the above-mentioned method, except for using a compound in which triarylmethylene group is bound to iodine through monophenylene or diphenylene group, as shown in the following formulas.

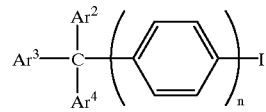

The above-mentioned photochromic compounds shown as formulas (11) to (18) have a decreased crystallization speed due to the volumed group having three aryls, thereby forming amorphous thin film by themselves. The formed amorphous thin films can also exhibit the reversible photochromic reaction as is the case with the compounds in a liquid system containing the compounds. In addition, such amorphous thin films are composed of the photochromic compounds. This is different from the conventional thin films in which the photochromic compound is dispersed into a polymer matrix (refer to as "dispersed-type thin film" hereafter). Therefore, the thin films according to the present invention exhibit a larger change of optical properties, e.g., light absorption coefficient, refractive index, optical rotatory (17)

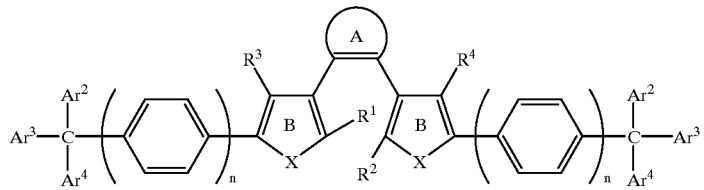

(18)

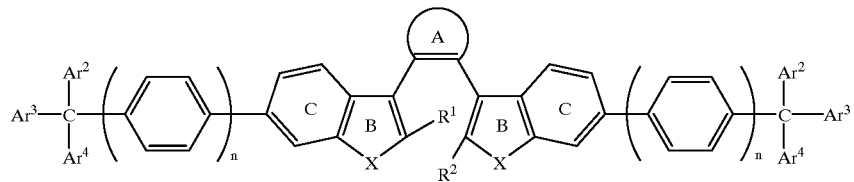

In the above formulas, each of aryls, $Ar^2$, $Ar^3$ and $Ar^4$ is benzene ring such as phenyl, condensed ring such as naphtyl, hetero ring such as pyridyl or derivatives of these. The aryls may be same or different from each other.

$R^1$, $R^2$, $R^3$ and $R^4$ in formulas (17) and (18) are atomic groups similar to respective ones in formulas (11) and (12). The symbol "n" equals an integer of 1 or 2.

In the phenylene group used as a conjugated diene, a part or all of hydrogen atoms thereof may be substituted by alkyl group, alkoxy group, nitro group, cyano group, halogen atom, amino group or the like, within the range that does not adversary affect.

In the photochromic compounds represented by formulas (17) and (18), the volumed triarylmethylene suppresses the crystallization speed, to form a stable amorphous state. In power, permittivity or the like, due to the isomerization than the conventional dispersed-type of the thin film. Specifically, refractive index of the thin film made of the photochromic molecules of the present invention is changed in the order of $10^{-2}$ or more by isomerization, whereas that of the conventional dispersed-type thin film is changed in the order of $10^{-4}$. Moreover, by using the thin film of the present invention can be used for optical transmission path of an optical switching device, provided can be a high-speed optical switching device capable of completing a switching within a few nanoseconds.

The amorphous thin film made of the photochromic compounds according to the present invention can formed by a coating method, which is generally used for forming a organic thin film, including spin coating method, bar coating method, dipping method, fused-extrusion method and spray method. Specifically, the photochromic compound thin film can be formed by: dissolving the photochromic compound into an organic solvent having a high viscosity (e.g., toluene, butyl acetate and alcohols); applying the obtained solution onto a substrate; and volatilizing the solvent by heat treating at about 80 to 150° C.

The obtained thin film exhibits photochromic reaction, i.e., isomerization, in response to irradiating a light of a specific wavelength.

[Optical Function Device]

The optical function device according to the present invention uses an amorphous thin film made of the photochromic compound of the present invention.

The optical function device suitable for an optical memory includes a substrate; a recording layer provided on the substrate, the recording layer being made of an amorphous thin film of the photochromic compound of the present invention.

According to the present invention, the optical function device includes any type of inputting light from the substrate, inputting light to the recording layer directly, reading an intensity of the reflected light, using a difference of light transmittance for recording and reading, and using a difference of refractive index for recording and reading.

As illustrated in FIG. 1, optical function device P1 belongs =to types of inputting light from the substrate and of reading an intensity of the reflected light. This device comprises translucent substrate 1, recording layer 2 made of the photochromic compound thin film provided on substrate 1, and reflecting layer 3 provided on recording layer 2.

As substrate 1, used can be any translucent substrate, for example highly transparent glass, plastic and the like such as polyester resin, acrylic resin, polyamide resin, polycarbonate resin, polyolefin resin, phenol resin, epoxy resin and polyimide resin.

Substrate 1 preferably has a thickness of 0.5 to 1.5 mm. When the thickness is smaller than the range, the substrate may be deformed easily. On the other hand, when the thickness is larger than the range, the light transmittance for recording and reading decreases, resulting in deteriorating properties of the device.

Recording layer 2 is composed of the photochromic compound thin film of the present invention. As described above, the film is made of the photochromic compound in an amorphous state and it can be formed from the photochromic compound by itself by a coating method without dispersing into a polymer matrix.

Recording layer 2 preferably has a thickness of 100 Å to 5 µm, and more preferably 1000 Å to 1 µm. When the thickness is 100 Å or less, it is not possible to change the optical properties of such a thin recording layer by light irradiation. On the other hand, when the recording layer has a too large thickness of 5 µm or more, the photoreaction rate of the layer in the thickness direction undesirably decreases. In addition, since the recording layer of the present invention is a thin film made of the photochromic compound by itself, it has a higher density of the photochromic compound than the conventional dispersed-type thin film. It results in a large change of optical properties by the light irradiation sufficient to be detectable even in case of the recording layer having a small thickness of 1 micron.

Reflecting layer 3 is a layer for reflecting the incident light that has passed trough the recording layer, and made of an incorrodible metal or semimetal having a high reflection rate through vapor deposition or the like. The metal may include Au, Al, Ag, Cu, Cr, Ni and the like, and the semimetal may include Si and the like. Reflecting layer 3 preferably has a thickness of 50 to 3000 Å, and more preferably 100 to 3000 Å. If the thickness is less than 50 Å, the reflecting layer is too thin to reflect sufficiently the light transmitted through the recording layer. On the other hand, the reflecting layer thickness of about 3000 Å is enough for reflecting most of the transmitted light, and therefore the reflecting layer does not need to have more than 3000 Å thickness. Such an unnecessarily large thickness prevents compaction of the obtained optical function device and, moreover, it results in raising the device cost.

The optical function device, P1, having the above-mentioned structure is capable of recording information by isomerization of the photochromic compound (i.e., isomer A) of the recording layer to isomer B through incident light L1 from the side of substrate 1. In this case, isomers A and B are referred to as an initial state-isomer and a recording state-isomer respectively. Through it is not limited which one of open-ring and closed-ring forms of the compound is used as the recording state-isomer, generally it is preferred to set for using the open-ring form (bleached) as the initial-state isomer and using the closed-ring form (colored) as the recording-state isomer. In such a preferable setting, a shorter-wave light source is used for recording. The shorter-wave light gives a smaller spot diameter on the recording layer, resulting in higher density recording.

The recorded information can be erased by irradiation of light having such a wavelength that retransforms isomer B, which is formed for recording, into isomer A.

The recorded information can be read by inputting light L2 and then detecting light L2 outputted after transmitted through recording layer 2 and reflected by reflecting layer 3. As light L2, i.e., a light for reading, used may be any light having such a wavelength that gives a detectable optical difference between isomers A and B. However, generally used is light for recording or light for erasing to decrease the number of light sources in the optical function device, to comply with the demand on compacting the optical function device. In case of using light for recording to read the recorded information, the light may be partly absorbed by a non-recorded portion of the recording layer. On the other hand, in case of using light for erasing, the light may be partly absorbed by a recorded portion of the recording layer. However, setting the light for reading to have a smaller intensity than those for recording and erasing can prevent recording new information or undesirable erasing of the recorded information. Accordingly, reading the recorded information can be performed by reading the intensity of light L2 reflected by a recorded portion of the recording layer in case of using light for recording, or by reading the intensity of light L2 reflected by a non-recorded portion of the recording layer in case of using light for erasing.

Figure 2:
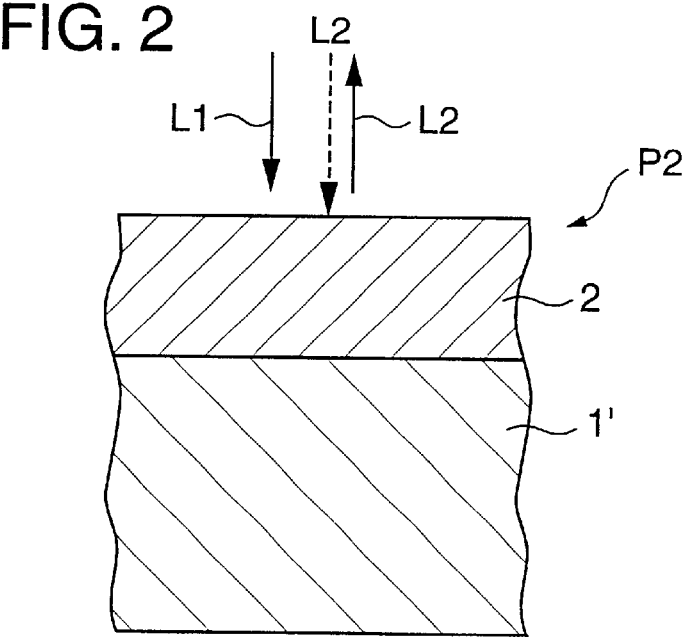

Optical function device P2 illustrated in FIG. 2 belongs to types of inputting light from the substrate and of reading a difference of absorbance of the reflected light. Optical function device P2 has opaque substrate 1' for reflecting light so that it does not need a further reflecting layer like reflecting layer 3 of optical device P1. On substrate 1', recording layer 2 of the photochromic compound thin film according to the present invention is provided.

Opaque substrate 1' may be made of opaque plastic such as epoxy resin, ceramics such as alumina, metal such as aluminum and gold or the like. Substrate 1' preferably has a thickness of 0.5 to 1.5 mm. When the thickness is smaller than the range, the substrate is deformed easily. On the other hand, when the thickness is larger than the range, the light transmittance for recording and reading decreases, resulting in deteriorating properties of the obtained device.

As is the case with optical function device P1, recording layer 2 is composed of the photochromic compound thin film having a thickness of about 100 Å to 5 µm.

Optical function device P2 having the above-mentioned structure is capable of recording information by isomerizing the photochromic compound (i.e., isomer A) of the recording layer to isomer B through the incident light from the side of recording layer 2. The recorded information can be erased by irradiation of light having such a wavelength that isomer B can retransform to isomer A.

Similarly to optical function device P1, the recorded information can be read by light having such a wavelength that gives a detectable difference of optical properties between the isomers. As the light for reading, light for recording or light for erasing is practically used. By setting the light for reading to have a smaller intensity than those for recording and erasing, the absorbance of light L2 reflected by substrate 1' can be read for reading the recorded information without recording new information or undesirable erasing of the recorded information.

Figure 3:
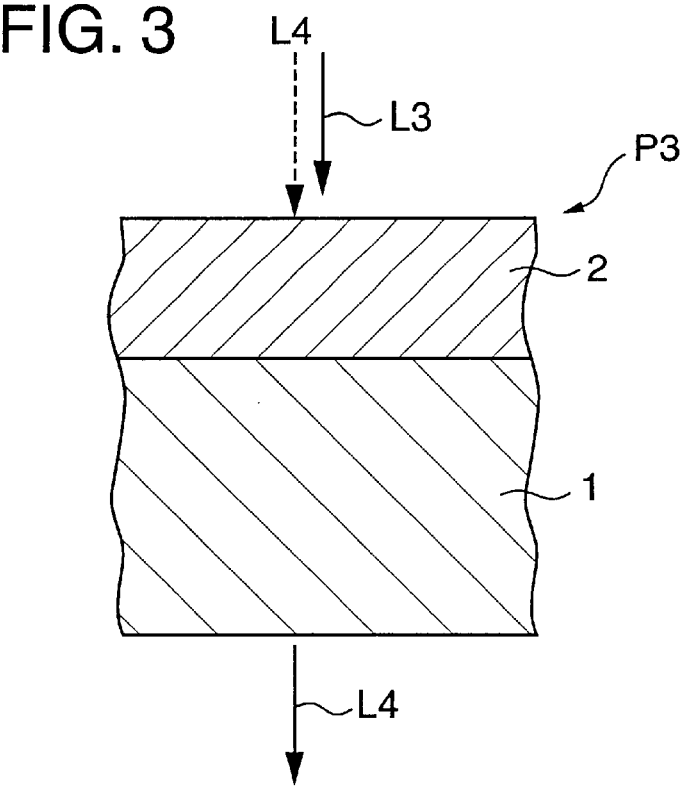

Optical function device P3 illustrated in FIG. 3 belongs to types of using a difference of light transmittance between incident and output lights for reading information. In optical function device P3, recording layer 2 of the photochromic compound thin film according to the present invention is provided on translucent substrate 1.

As translucent substrate 1, used may be any substrates that can be used in optical function device P1. Also, as the photochromic compounds of the recording layer, used may be similar compounds to those used in optical function devices P1 and P2. Of course, optical function device P3 needs to be constituted in such a manner that it has a sufficient large light transmittance difference.

In optical function device P3, the photochromic compound (i.e., isomer A) of the recording layer isomerizes to isomer B by light L3 input from the side of recording layer 2, to record information. The recorded information can be erased by irradiation of light having such a wavelength that isomer B can retransform to isomer A. Similarly to optical function device P1, the recorded information can be read by light having such a wavelength that gives a detectable difference of optical properties. As the light for reading, light for recording or light for erasing is practically used. Setting the light for reading to have a power smaller than those for recording and erasing can prevent recording new information or undesirable erasing of the recorded information. In case that the light for recording is used as light for reading L4, the intensity of light L4 reflected by a recorded portion of recording layer 2 is read for reading the recorded information. On the other hand, in case that the light for erasing is used as light for reading L4, the intensity of light L4 reflected by a non-recorded portion of recording layer 2 is read for reading the recorded information.

Optical function device P3 is also applicable for reading the recorded information based on a refractive index difference, when incorporated into an optical system as shown in FIG. 4. Since the photochromic compound thin film of the present invention has a large difference of refractive index between its isomers, the recorded information can be read by making use of such a refractive index difference. Thus, this type of the optical system is applicable for a three-dimensional recording memory and a hologram memory.

Figure 4A:
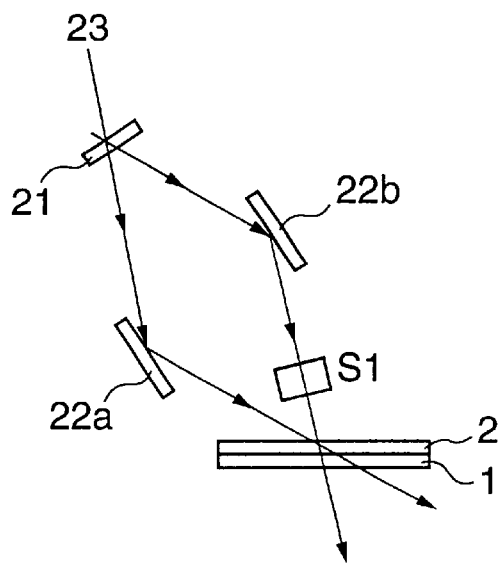
FIGS. 4A and 4B are a schematic view illustrating an optical system having an optical function device that uses a refractive index difference.

In the optical system in FIG. 4, optical function device P3 is arranged in such a manner that one split light by beam splitter 21 is reflected by mirror 22a to be introduced to recording layer 2 of optical function device P3 and the other light is reflected by mirror 22b to be introduced to recording layer 2 of optical function device P3 through shutter S1. As shown FIG. 4A, in order to record information on recording layer 2 and to erase the information from recording layer 2, a light capable of leading the photochromic reaction is input and then reflected by mirrors 22a and 22b to be introduced to recording layer 2, with shutter S1 open.

Figure 4B:
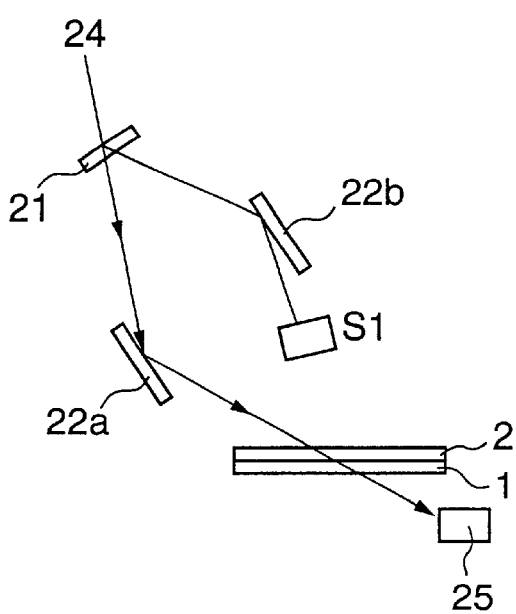

As the light for reading information, used may be any light having such a wavelength that gives a large refractive index difference between a transmitted light through the recorded portion of the recording layer and that through the non-recorded portion. However, preferably used may be light having the same wavelength as that of light for recording or for erasing to decrease the number of light sources in the optical function device, to comply with the demand on compacting the optical function device. Reading the recorded information in this system is performed with shutter S1 closed as shown in FIG. 4B. One of the beams that have passed through beam splitter 21 is reflected by mirror 22a, to be introduced to recording layer 2 of optical function device P3. The other beam is reflected by mirror 22b and then blocked by shutter S1. Subsequently, a refractive index distribution of the light transmitted through recording layer 2 and substrate 1 is detected by detector 25. In accordance with a difference between the detected refractive index distribution and the initial distribution before recording, the recorded information can be read.

Figure 5A:
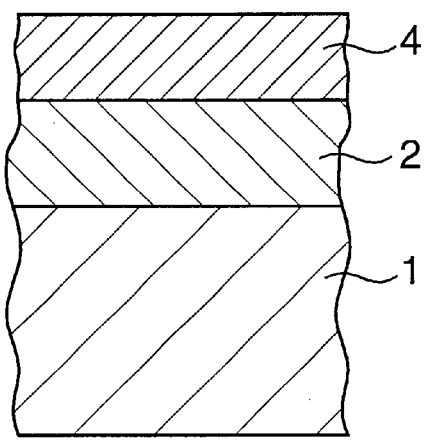
FIGS. 5A and 5B are a sectional view illustrating an optical function device including a protective layer.
Figure 5B:
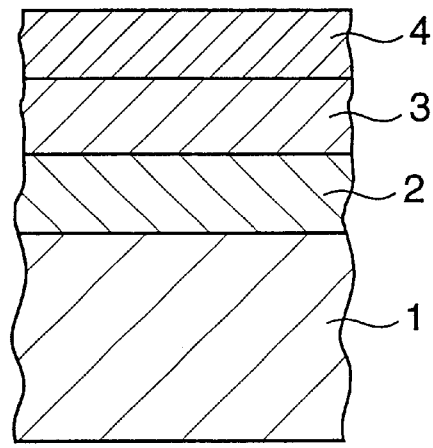

All of the optical function devices illustrated in FIGS. 1 to 3 have each one substrate and recording layer, and some of the devices further needs one reflecting layer according to the recording and reading systems. However, as illustrated in FIGS. 5A and 5B, the devises may have a multi-layer structure in which a protective layer covers the reflecting layer or recording layer, if necessary. FIG. 5A shows an optical function device having protective layer 4 covering recording layer 2, and FIG. 5B shows that having protective layer 4 covering reflecting layer 3.

As the protective layer, used may be a thin film of transparent resin such as poly(meth)acrylate and polycarbonate.

Then, the optical function device suitable for an optical switching device is explained below.

Figure 6:
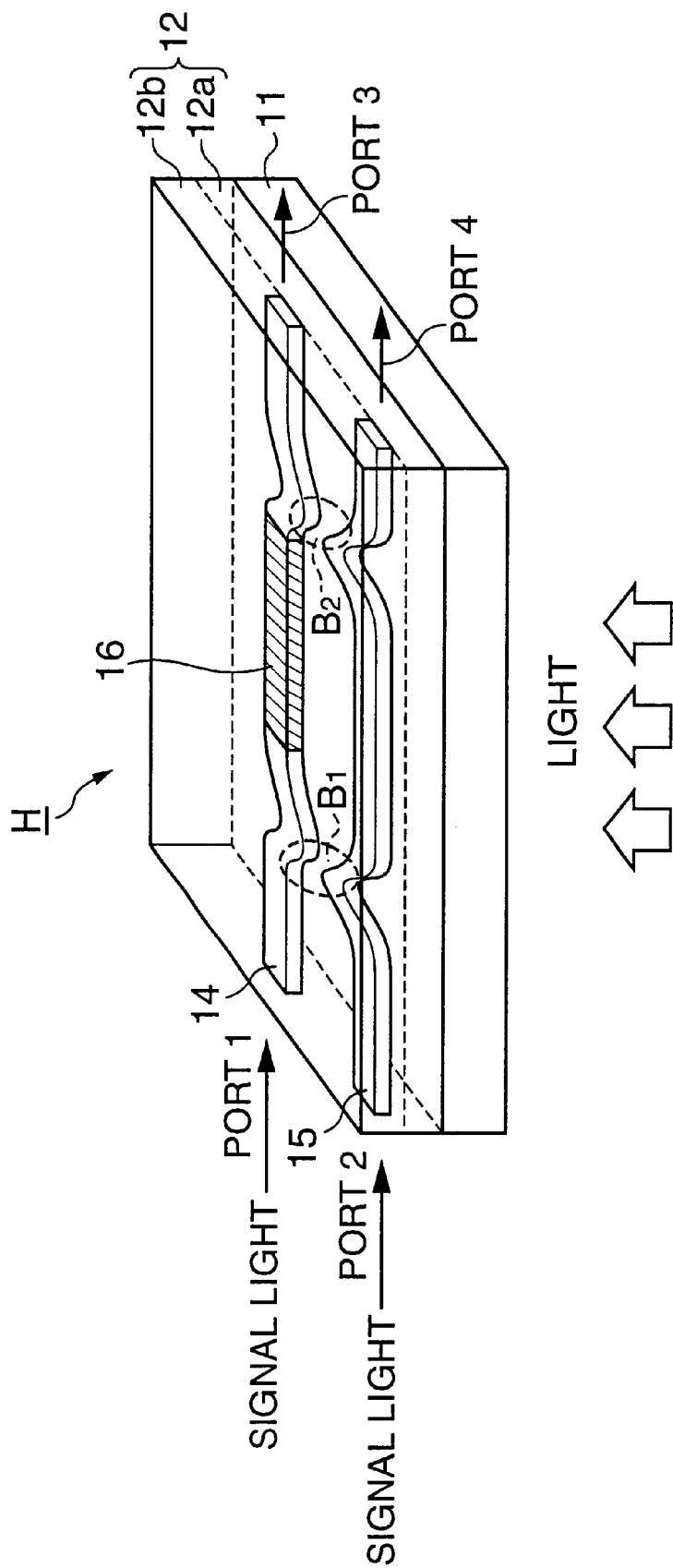
FIG. 6 is a view illustrating an optical function device suitable for an optical switching according to the present invention.

The optical function device for optical switching includes a translucent substrate, a transparent plastic layer provided on the substrate; a first and a second optical waveguides formed inside the transparent plastic layer, each of which has a first and a second branch sections for branching light passing trough the first and second optical waveguides. The first optical waveguide between the first and the second branch sections is covered with the clad layer composed of the photochromic compound thin film according to the present invention. As the specific example, an 2×2 Mach-Zehnder-type optical waveguide device H is shown in FIG. 6.

In optical waveguide device H, on optical waveguide substrate 11 made of transparent material such as glass, provided is transparent plastic layer 12 in which optical waveguides are clad. Plastic layer 12 may be made of methyl polymethacrylate (PMMA) or the like. Plastic layer 12 is composed of lower and upper plastic layers 12a, 12b and produced as follows: fluorinated PMMA-made lower plastic layer 12a, on which first and second optical waveguides 14, 15 are provided by cladding, is formed on substrate 11; and then upper plastic layer 12b is provided on lower plastic layer 12a so as to integrate the plastic layers. Optical waveguides 14, 15 are formed along the travel direction of a signal light. Each optical waveguide has two crooks where optical waveguides 14, 15 come closer to each other (i.e., where the width between the optical waveguides is smaller), to form two branch sections, B1 and B2. Optical function section 16, i.e. a clad layer made of a photochromic compound thin film, is provided between branch sections B1 and B2 of first optical waveguide 14.

Optical waveguide device H can exhibit a switching function as explained in the followings. First, a signal light (e.g., infrared light having a wavelength of 1.55 $\mu$m) is introduced to first and second optical waveguides 14, 15 through respective one end thereof, i.e., port 1 and port 2. The signal lights that have passed through first and second optical waveguides 14, 15 bind or interfere with each other at branch section B1. Those lights are bound with each other again at branch section B2. When irradiating, from the backside of substrate 11, a light capable of isomerizing the photochromic compound contained in optical function section 16 (ultraviolet light of 380 nm or less or blue light of 380 to 450 nm, for example), the light transmits substrate 11 and lower plastic layer 12a and then isomerizes the photochromic compound of optical function section 16. Thus, refractive index of the light passing through first optical waveguide 14 is changed at optical function section 16. Accordingly, when the light passing through first optical waveguide 14 is bound with the light passing through second optical waveguide 15 at branch section B2, these lights are interfered with each other based on the phase difference therebetween. Then, the lights are respectively output from optical waveguides 14, 15 through ports 3, 4. As a result, the output lights are different from the respective input light in intensity. In other words, the intensity ratio of output light to input light at ports 3, 4 are respectively changed. Therefore, the light phase difference at branch section B2 can be controlled by changing refractive index due to optical function section 16 by irradiation of light for isomerizing the photochromic compound (light for isomerization), and such an appropriate control of the light phase difference can make it possible to control appropriately the output light intensity at ports 3 and 4, resulting in obtaining a switching function.

Preferably, the optimum length of optical function section 16 is determined according to the amount of the refractive index change.

Thus, by using the photochromic compound of the present invention, obtained can be an optical switching which is controllable only by light. There has been a problem with the conventional optical switching using photo-reflective material that a voltage or a current needs to be applied to operate the optical switching. However, since the optical switching using the photochromic compound thin film according to the present invention is controllable only by light, it is operable without consuming an additional energy. In addition, the optical function device for an optical switching using the photochromic compound thin film according to the present invention has an excellent high-speed switching ability, resulting from the quick isomerization only by light irradiation.

EXAMPLES

Practical Example 1

Triphenylamine-type photochromic compound and optical function device using the same
[Synthesis of Photochromic Compound]

Figure 7:
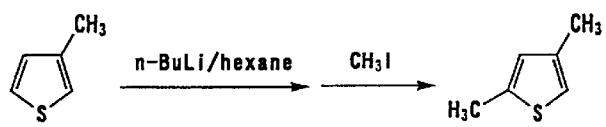
FIG. 7 is a reaction formula showing processes for synthesizing the photochromic compound in practical example 1.
Figure 7:
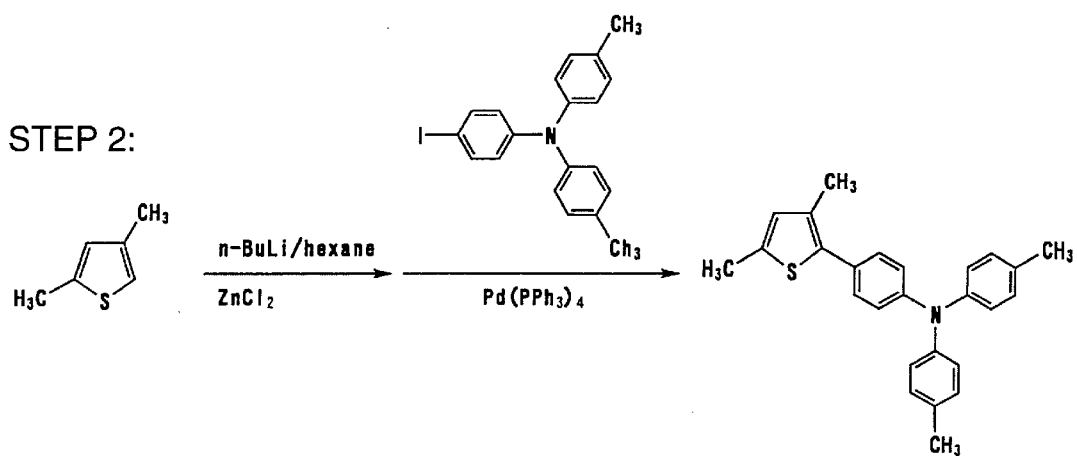
Figure 7:
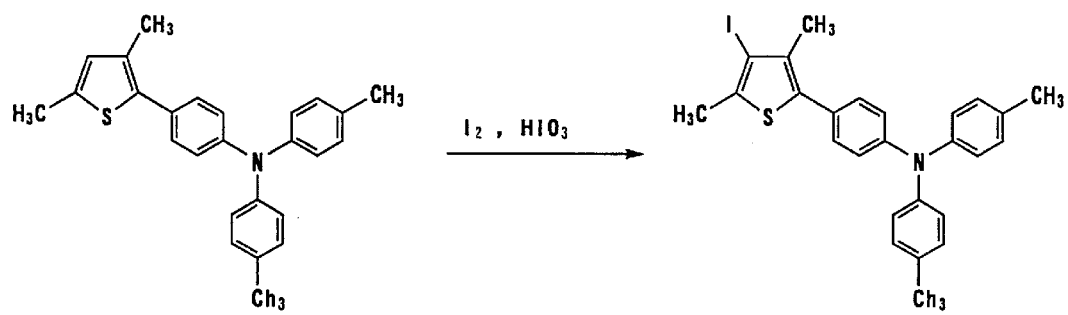
Figure 7:
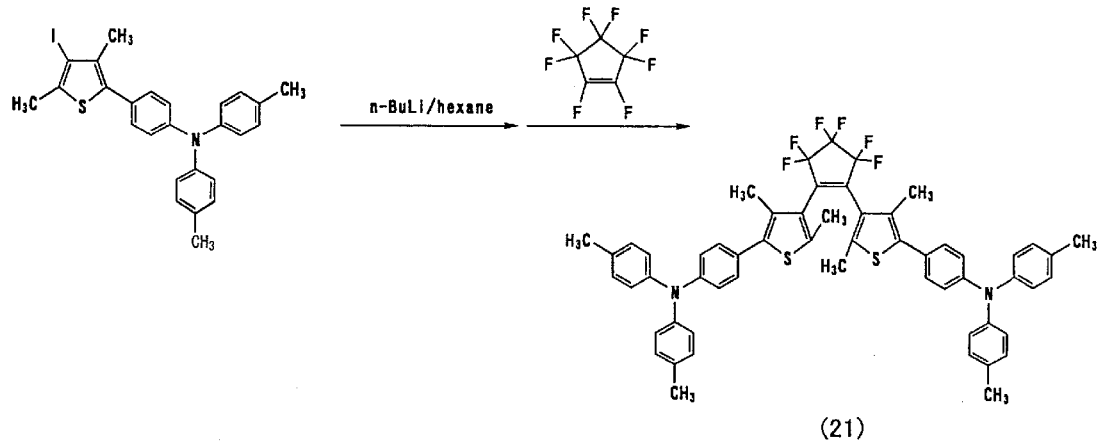

The triphenylamine-type photochromic compound is synthesized according to the reactions shown in FIG. 7.

(1) Step 1: synthesis of 2,4-dimethylthiophene 25.5 g (0.26 mole) of 3-methylthiophene, 125 ml of dry ether and 33.2 g of TMEDA (tetramethylethylenediamine) were mixed into a 300 ml three-neck flask and cooled to 0° C. To the cooled mixture, dropped slowly was an n-BuLi solution obtained by dissolving 204 ml of n-butyllithium (n-BuLi) into hexane. After the dripping, the resultant solution was stirred for one hour at 0° C. and for two hours at room temperature.

With icing the resultant solution again, 17.5 ml of methyl iodide was added thereto. Then the solution was stirred for two hours at 0° C. and for three hours at room temperature. After the stirring, the solution was separated into an organic phase and a water phase by adding water. Then the water phase was extracted by ether. The organic phase was washed with dilute hydrochloric acid and additionally with water, and subsequently dried by magnesium sulfate anhydride. The used magnesium sulfate was removed with a glass filter, and then the solvent was removed in vacuo. The obtained liquid was purified with silica gel column-chromatography and distilled in vacuo, thereby obtaining a bleached liquid of 2,4-dimethylthiophene. The yield in this step was 19.8 g, and yield ratio was 68%.

(2) Step 2: synthesis of 2,4-dimethyl-5-(4-(N,N'-bis(4-methylphenyl)amino)phenyl)thiophene 22.4 g (0.2 mole) of the 2,4-dimethylthiophene obtained in step 1 was put into a three-neck flask, and 200 ml of dry ethylether and 22.5 g (0.22 mole) of TMEDA were added thereto. Then, added to the mixture was 177 ml of n-butyl lithium/hexane solution (1.4 mole/l) with being stirred at room temperature. Then, the resultant solution was stirred for two hours at room temperature.

After the two-hour stirring, 200 ml of zinc chloride/ether solution (0.2 mole of zinc chloride) was added to the resultant solution, followed by further stirring for five hours at room temperature. The obtained solution was referred to as reaction solution A.

In another 500 ml three-neck flask, 92.3 g (0.2 mole) of 4-iodo-4',4"-dimethyltriphenylamine, 2.31 g (0.2 mole) of tetrakis(triphenylphosphine)palladium and 200 ml of dry tetrahydrofuran were mixed. Then the mixture was stirred for one hour at room temperature. After the one-hour stirring, the mixture was dropped by reaction solution A, which has been prepared as described above, at room temperature. Then, the reaction system was heated to 50° C., followed by stirring for two hours at 50° C. and further stirred for five hours at room temperature.

After the stirring, the obtained solution was separated into an organic phase and a water phase by adding water. Then the water phase was extracted by ether. The organic phase was washed with dilute hydrochloric acid and additionally with water, and subsequently dried by magnesium sulfate anhydride. The used magnesium sulfate was removed with a glass filter, and then the solvent was removed in vacuo. The obtained liquid was purified with silica gel column-chromatography and distilled in vacuo, thereby obtaining a bleached liquid of 2,4-dimethyl-5-(4-(N,N'-bis(4-methylphenyl)amino)phenyl)thiophene. The yield in this step was 70.74 g, and yield ratio was 92%.

(3) Step 3: synthesis of 3-iodo-2,4-dimethyl-5-(4-(N,N'-bis(4-methylphenyl)amino)phenyl)thiophene 38.3 g (0.1 mole) of the 2,4-dimethyl-5-(4-(N,N'-bis(4-methylphenyl)amino)phenyl)thiophene obtained in the prior step was put into a three-neck flask, and 650 ml of acetic acid and 650 ml of carbon tetrachloride were added thereto. Further added were a solution made by dissolving aqueous solution of iodic acid (iodic acid: 3.8 g (0.022 mole)) into 10 ml of water, and 8.73 g (0.034 mole) of iodine. Then, the obtained mixture was refluxed with heat for two hours. After the reflux with heat, the obtained solution was separated into an organic phase and a water phase by adding water. Then the water layer was extracted by chloroform. The organic layer was washed with aqueous solution of sodium carbonate, sodium thiosulfate and additionally with water, and subsequently dried by magnesium sulfate anhydride. The used magnesium sulfate was removed with a glass filter, and then the solvent was removed in vacuo. The obtained liquid was purified with silica gel column-chromatography and distilled in vacuo, thereby obtaining a bleached liquid of 3-iodo-2,4-dimethyl-5-(4-(N,N'-bis(4-methylphenyl)amino) phenyl)thiophene. The yield in this step was 36.65 g, and yield ratio was 72%.

(4) step 4: synthesis of photochromic compound shown in formula (21) 35.63 g (0.07 mole) of the obtained in step 3 was put into a 500 ml three-neck flask, and 150 ml of dry tetrahydrofuran was added thereto. The mixture was cooled by putting the flask in dry ice/methanol bath. To the cooled mixture, dropped slowly was 75 ml (0.105 mole) of n-butyllithium (n-BuLi)/hexane solution. After the dripping, the resultant solution was stirred for one hour at −78° C.

Then, the resultant solution was added by 2.35 ml (0.0175 mole) of perfluorocyclopentene, followed by stirring for five hours at 0° C. After the stirring, the solution was separated into an organic phase and a water phase by adding water. Then the water phase was extracted by ether. The organic phase was washed with dilute hydrochloric acid and additionally with water, and subsequently dried by magnesium sulfate anhydride. The used magnesium sulfate was removed with a glass filter, and then the solvent was removed in vacuo. The obtained liquid was purified with silica gel column-chromatography and distilled in vacuo, thereby obtaining an objective white solid of photochromic compound shown in formula (21). The yield in this step was 38.08 g, and yield ratio was 58%.

As to each of the obtained compounds in the above-mentioned steps, a structure analysis was performed by means of 1H-NMR, 13C-NMR, FT-IR and GC/MS. From the results, all of the compounds were proved to be objective products.

[Characteristics of Photochromic Compound]

1. Optical absorption properties

As to the obtained photochromic compound, examined was the change of absorbance of due to the ultraviolet light irradiation. That is, absorption spectra were measured on the obtained photochromic compound in hexane before and after the ultraviolet light irradiation. The results were shown in FIG. 8.

Figure 8:
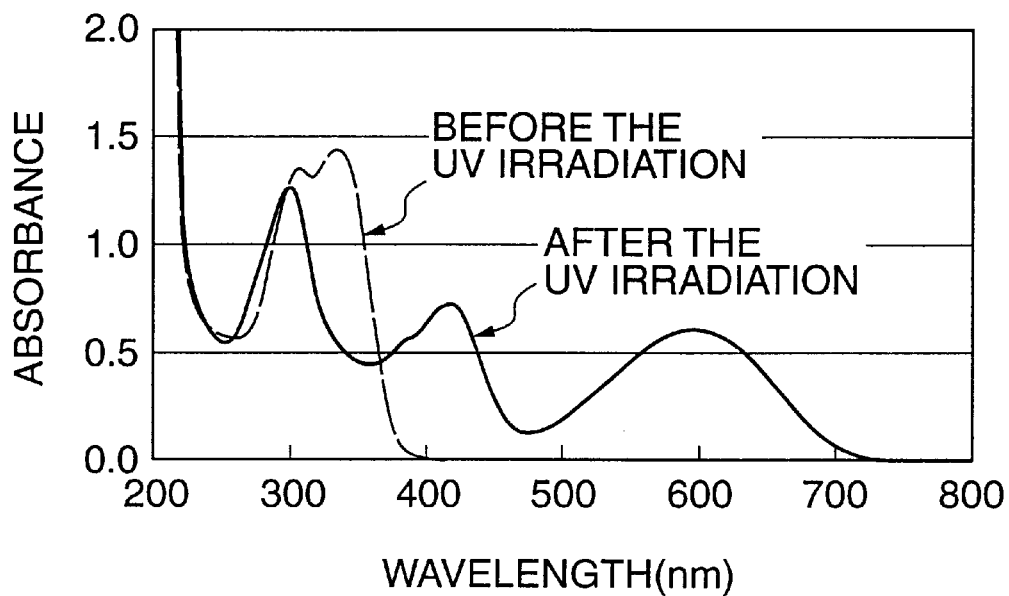
FIGS. 8 and 9 are respectively showing absorption spectra of the photochromic compound in a liquid state and in a form of thin film obtained in practical example 1.

As shown in FIG. 8, the compound before the ultraviolet light irradiation (i.e., open-ring form) had maximum wavelengths of 306 and 333 nm. In addition, it was found that the compound showed large molar absorption coefficient on these points, whose specific values were 48000 (306 nm) and 52000 (333 nm). When an ultraviolet light of 313 nm in wavelength was irradiated to the compound, the solution containing the compound turned its color to blue. And the maximum absorption was found at near 595 nm and the molar absorption coefficient at this point was 21000.

2. Photochromic reaction and stability of photochromic compound

The photochromic compound according to formula (21) exhibits the isomerization reaction shown as the following formulas.

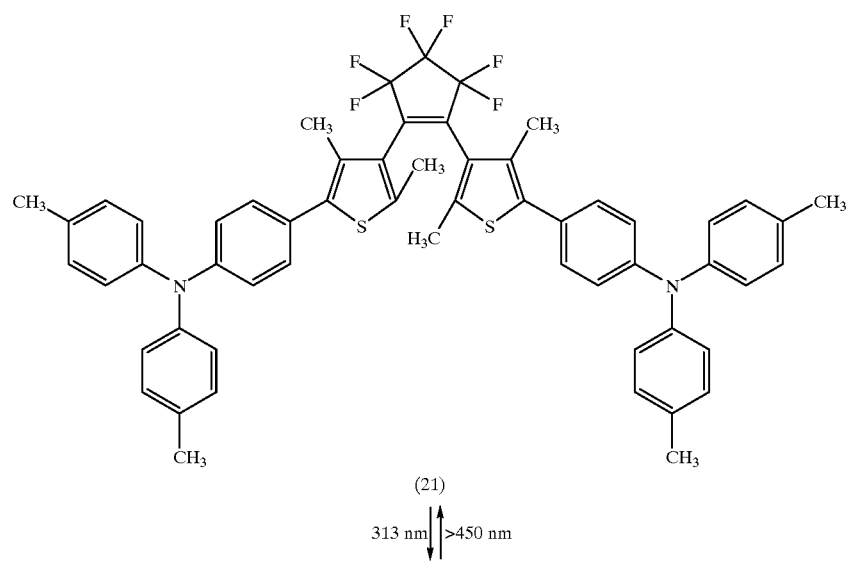

-continued

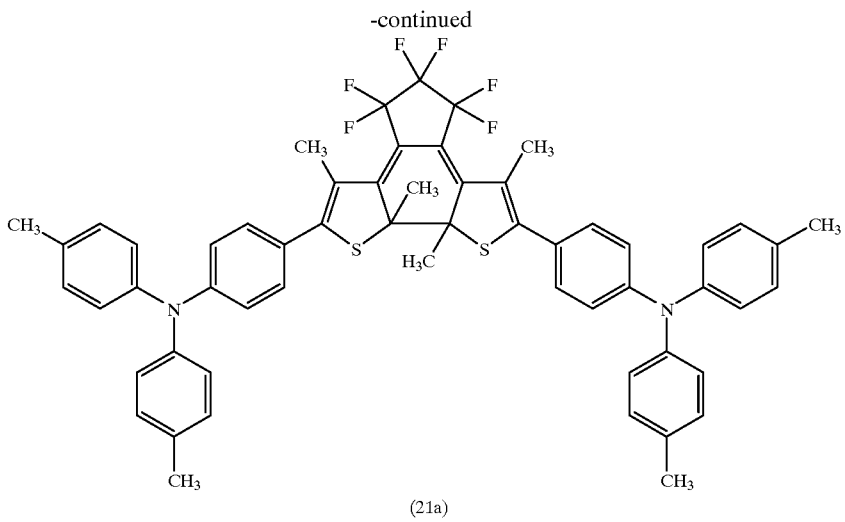

(21a)

In other words, open-ring form (21) closes its ring, i.e., undergoes a ring-closing reaction, by the ultraviolet light irradiation, to be closed-ring form (21a). Then the closed-ring form retransforms into open-ring form (21), i.e., undergoes a ring-opening reaction, by the visible light irradiation.

The ring-closing and ring-opening reactions had a quantum yield of 0.44 and of 0.005, respectively. In addition, it was found that the compound with the light in a photo-stationary state had an isomerization rate to closed-ring form (21a) of almost 100%.

According to the results of the DSC measurement, closed-ring form (21) had a glass transition temperature of 103° C. and open-ring form (21a) had that of near 124° C. It should be an innovation that such a diarylethene photochromic compound exhibited a glass transition temperature of greater than 100° C.

Closed-ring form (21a) had a pyretic peak, resulting from the isomerization due to heat (retransformation by heat) at about 180° C. This revealed that heat of about 200° C. may lead the ring-opening reaction to the open-ring form (21a), although is was sufficiently stable at room temperature.

[Producing a Photochromic Compound Thin Film]

The tryarylphenylamine photochromic compound (21) synthesized according to the above-mentioned method was dissolved into toluene. The obtained toluene-dissolving solution was applied on a silica substrate by spin-coating method, followed by baking at 90° C., to produce a thin film of tryarylphenylamine photochromic compound (film thickness: 1 µm).

The obtained thin film was examined by x-ray diffraction and also by polarization microscope. Only a broad halo was observed in the x-ray diffraction measurement. And in the polarization microscope observation, the film was observed black because the light was not transmitted therethrough in the crossed nicols state. Consequently, it was proved that this thin film was a homogeneous amorphous film.

It was also proved that, even after the thin film was left for more than six months, it hardly had a defect due to the crystallization and, therefore, properties of the thin film were not deteriorated. This was surprising, when compared with a general organic thin film, which is more likely to be crystallized and, if it is left for a long period of time, is crystallized easily and the crystallized part forms a defect to deteriorate the thin film properties.

[Characteristics of Thin Film]

1. photochromic reactions

Figure 9:
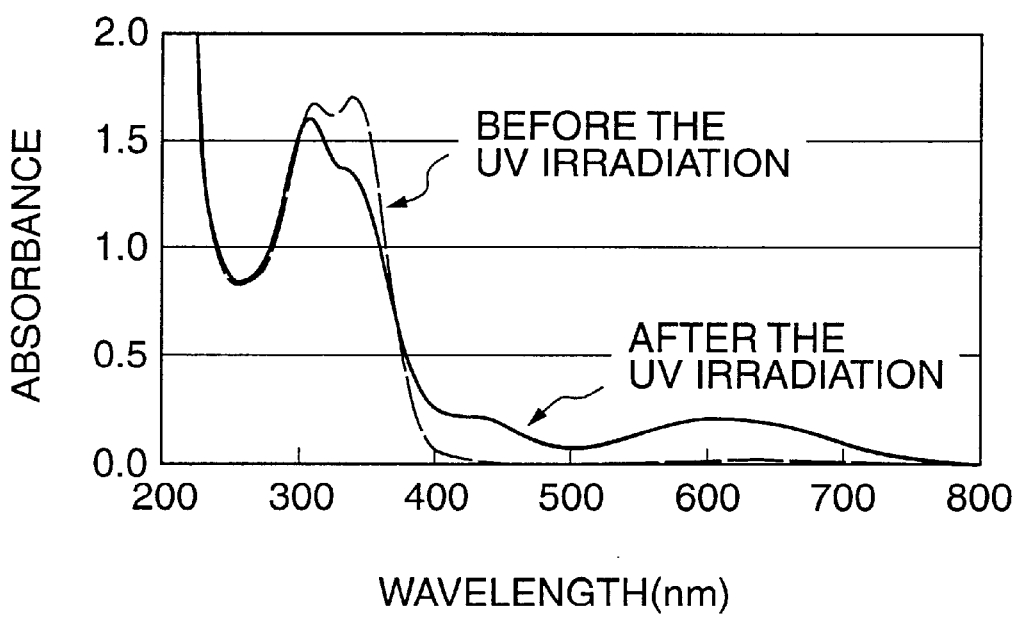

FIG. 9 shows absorption spectra of the obtained thin film before and after the irradiation of ultraviolet light (313 nm).

As shown in FIG. 9, the thin film before the ultraviolet light irradiation (open-ring form thin film) had absorption peaks around 306 and 333 nm in wavelength. On the other hand, the thin film after the ultraviolet light irradiation (closed-ring form thin film) was colored into green and had the maximum absorption around 606 nm. Then, when the light of 542 nm was irradiated to the thin film after the ultraviolet light irradiation, the thin film was bleached again and had an absorption spectral similar to that before the ultraviolet light irradiation. This change of the absorption wavelength was found to be reversible. In other words, it was proved that the compound can undergo the reversible photochromic reaction even in the form of a thin film.

It was also found that the thin film of the photochromic compound in practical example 1 can undergo the light isomerization reaction even by He-Cd laser (wavelength: 442 nm). This phenomenon has not been observed in such cases that the compound dissolves into a solvent (liquid-state compound) and that the compound forms a conventional thin film by dispersing the compound into a polymer matrix (a dispersed-type thin film). In these cases (i.e., liquid state compound and the dispersed-type thin film), the absorption spectra were affected by the matrix or the solvent. On the other hand, in the amorphous thin film according to the present invention, which is made of the photochromic compound by itself, the angle between one plane of one thiophene ring and the other plane of the other thiophene ring decreases in such manner that these planes to the same plane, resulting in an extended a length of π electron conjugation. This is considered to make the absorption wavelength longer, particularly longer than 400 nm. Accordingly, triphenylamine photochromic compound in practical example 1 can be isomerized not only by ultraviolet light but also by blue visible light.

Furthermore, even in case that the thin film in practical example 1 had a small thickness of 1 µm, it exhibited a large change of the absorption spectrum enough to recognize the photochromic reactions. The reason is considered to be as follows. In case of using the conventional thin film, it indispensably has a large thickness to increase an amount of the photochromic compound, in order to obtain a large change of absorption spectrum enough to recognize the photochromic reactions. On the contrary, in case of using the thin film of the present invention that is made of the photochromic compound by itself, it can contain a large amount of the photochromic compound enough to show such optical properties even it has a small thickness. Accordingly, by using the photochromic compound thin film according to the present invention, decreasing the size of the optical function device can be achieved.

2. Durability

By repeating the photochromic reactions for ten thousand times or more, properties of the obtained thin film was not deteriorated due to deterioration of the compound in the film. Also, by leaving the thin film for 5000 hours or more at 80° C. in the dark, the thin film properties was not deteriorated.

3. Refractive index

To the obtained thin film, lasers of 633, 817 and 1550 nm wavelength were irradiated. Then, as to each laser, examined was the relation between ultraviolet light irradiation time and refractive index of the thin film. The results were shown in FIG. 10.

Figure 10:
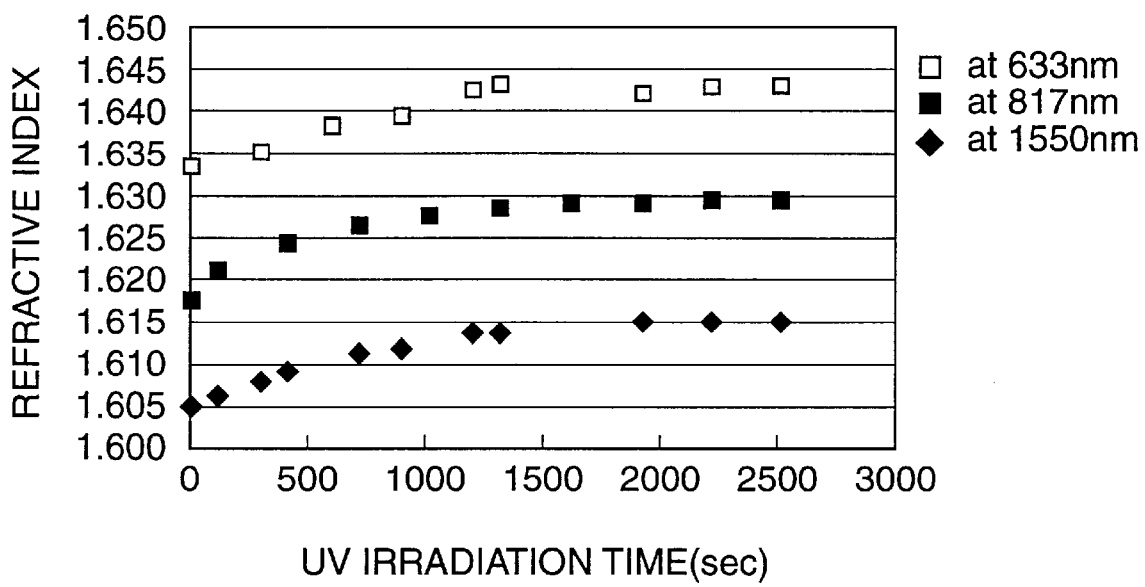
FIGS. 10 and 11 are graphs respectively showing relations between ultraviolet light irradiation time and change of refractive index of the thin films in practical example 1 and comparative example 2.

As shown in FIG. 10, as the wavelength of the laser was longer, refractive index becomes smaller. However, in case of using any of these lasers, the difference of refractive index was about 0.01 ($1.2 \times 10^{-2}$) between before the ultraviolet light irradiation (i.e. at 0 time) and after the ultraviolet light irradiation (i.e., at a time when the increase of refractive index becomes constant, that is, when the film is in the photo-stationary state). According to FIG. 10, it was also found that refractive index increases as the photochromic reaction proceeds by the ultraviolet irradiation. Accordingly, by using the photochromic compound thin film according to the present invention, it is possible to analog-control refractive index of the thin film by the control of the irradiation amount of the light (in particular, the intensity of the irradiation light or irradiation time). Therefore, the thin film is suitably applied to hologram memory, multi-layer recording device and the like.

[Manufacturing an Optical Recording Device]

P1-type optical recording device:

P1-type optical recording device P1 was manufactured by: using a polycarbonate plate as substrate 1; applying the photochromic compound in practical example 1 on the substrate as a recording layer; depositing Al onto the photochromic compound to form a reflecting layer; and further forming a protective layer made of acrylic resin on the reflecting layer.

The ultraviolet light was irradiated over optical recording device P1 to let the photochromic compound of the recording layer be in a colored-state, to initialize it. Subsequently, optical recording device P1 was mounted on an equipment whose pickup is loaded with a semiconductor laser (wavelength: 680 nm). Then the evaluations of recording and reading were made.

In the evaluations, for recording information, a laser of 680 nm in wavelength and 10 mW in intensity irradiated to the device to isomerize the photochromic compound of the recording layer. Thereafter, for reading the recorded information, a laser of 680 nm in wavelength and 0.2 mW in intensity irradiated to the device to measure the intensity of the reflected light. As a result, a read signal having a high C/N ratio of 50 dB or more was obtained. In addition, even after ten thousand-time of reading, the device could perform reading without any degradation.

P3-type optical recording device:

P3-type optical recording device P3 was made by forming the photochromic compound in practical example 1 on a polycarbonate substrate.

He-Cd laser (wavelength: 442 nm) was irradiated to the obtained optical recording device, to record information. Then, the recorded information could be read based on the refractive index difference, which was measured by using a semiconductor laser (wavelength: 830 nm).

[Manufacturing an Optical Waveguide Device]

The optical waveguide device having a structure illustrated in FIG. 6 was manufactured by using PMMA for transparent plastic layer 12 and using the photochromic compound thin film according to the present invention for optical function section 16.

A light of 1.55 μm in wavelength was introduced to the obtained optical waveguide device through ports 1, 2 as a signal light. When an ultraviolet light irradiated from the backside of the substrate, the refractive index of the signal light was changed. This proved that this device is capable of switching the light of 1.55 μm in wavelength. In addition, this optical waveguide device had a switching speed more than $10^4$ times as high as the optical waveguide using the dispersed-type thin film in comparative example 2 explained below.

Comparative Example 1:

As indicated in the following formula, synthesized was a photochromic compound in which diarylethylaminophenyl group, instead of bis(4-methylphenyl)amino)phenyl group used in practical example 1, is bound to the diarylethene skeleton. The photochromic compound was dissolved into toluene to produce a thin film by spin coating method. Right after the formation of the film, the compound began to be crystallized. Therefore, a homogeneous amorphous thin film could not be obtained.

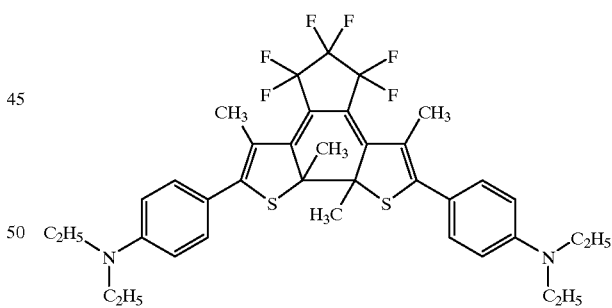

Comparative Example 2:

30 parts by weight of tryphenylamine compound synthesized in practical example 1 was dissolved into PMMA, to produce a PMMA dispersed-type thin film (film thickness: 1 μm) by spin coating method. In order to give the film an enough large change of absorption spectra between before and after light irradiation for recognizing the photochromic reaction, the thin film needed to have a thickness of greater than 1 μm.

To the obtained thin film, lights having 633 and 817 nm wavelength were irradiated. Then, as to each light, the relation between ultraviolet light irradiation time and refractive index of the thin film was examined. The results were shown in FIG. 11.

Figure 11:
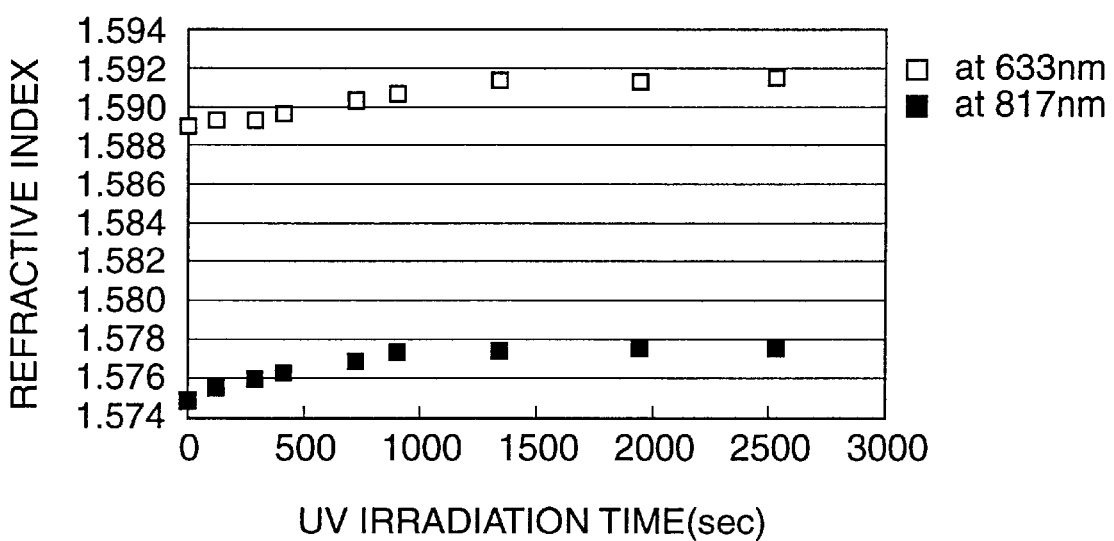

As shown in FIG. 11, the difference of refractive index was about $2\times10^{-3}$ between before the ultraviolet light irradiation (i.e. at 0 time) and after the ultraviolet light irradiation (i.e., at a time when the thin film is in the photostationary state). On the other hand, the thin film in practical example 1 had a refractive index difference of $1.2\times10^{-2}$. That is, this dispersed-type thin film in this comparative example had a smaller refractive index difference than the amorphous thin film composed of the photochromic compound.

Figure 12:
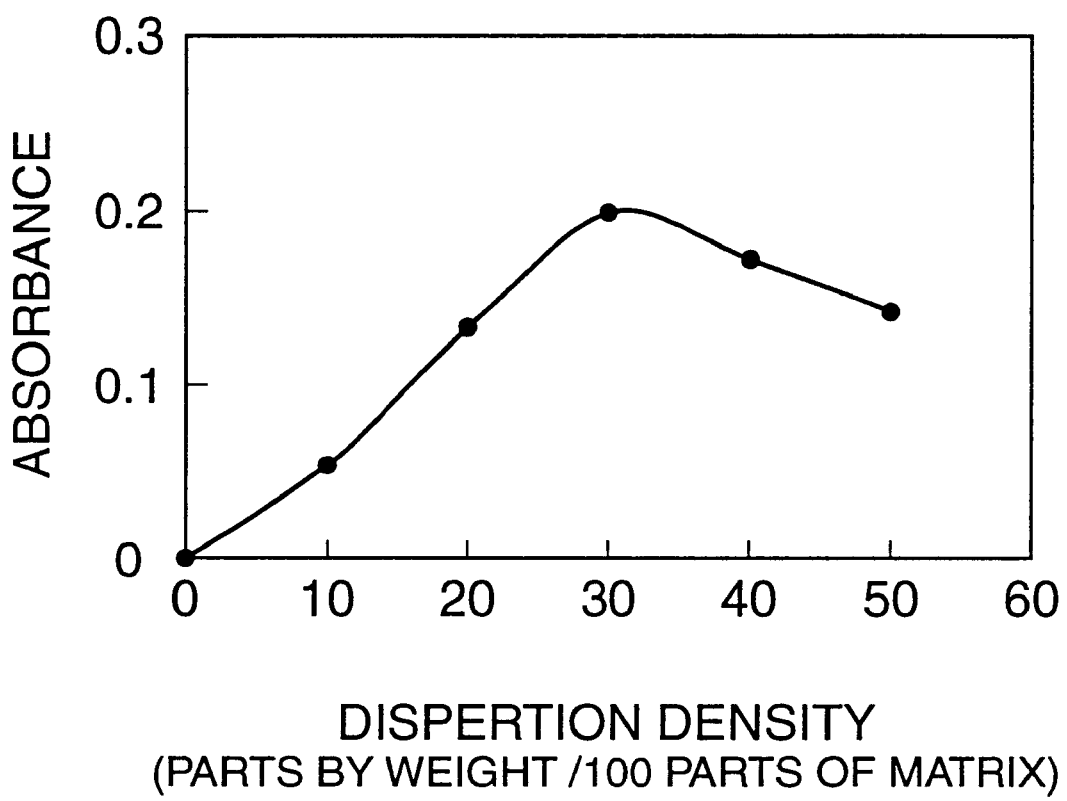
FIG. 12 is a graph showing a relation between density of the photochromic compound and absorbance of a dispersed-type thin film.

The relation between the dispersion density of triphenylamine compound to PMMA and absorbance was also examined. The results were shown in FIG. 12. According to FIG. 12, the thin film had the maximum absorbance when the density of the photochromic compound equaled 30 parts by weight. Even by increase of the photochromic compound density, it can be found difficult to obtain an absorbance larger than that when the density equals 30 parts by weight.

Practical Example 2

Photochromic compound having triphenylamine and conjugated double bond, and optical function device using the same

[Synthesis of Photochromic Compound]

Figure 13:
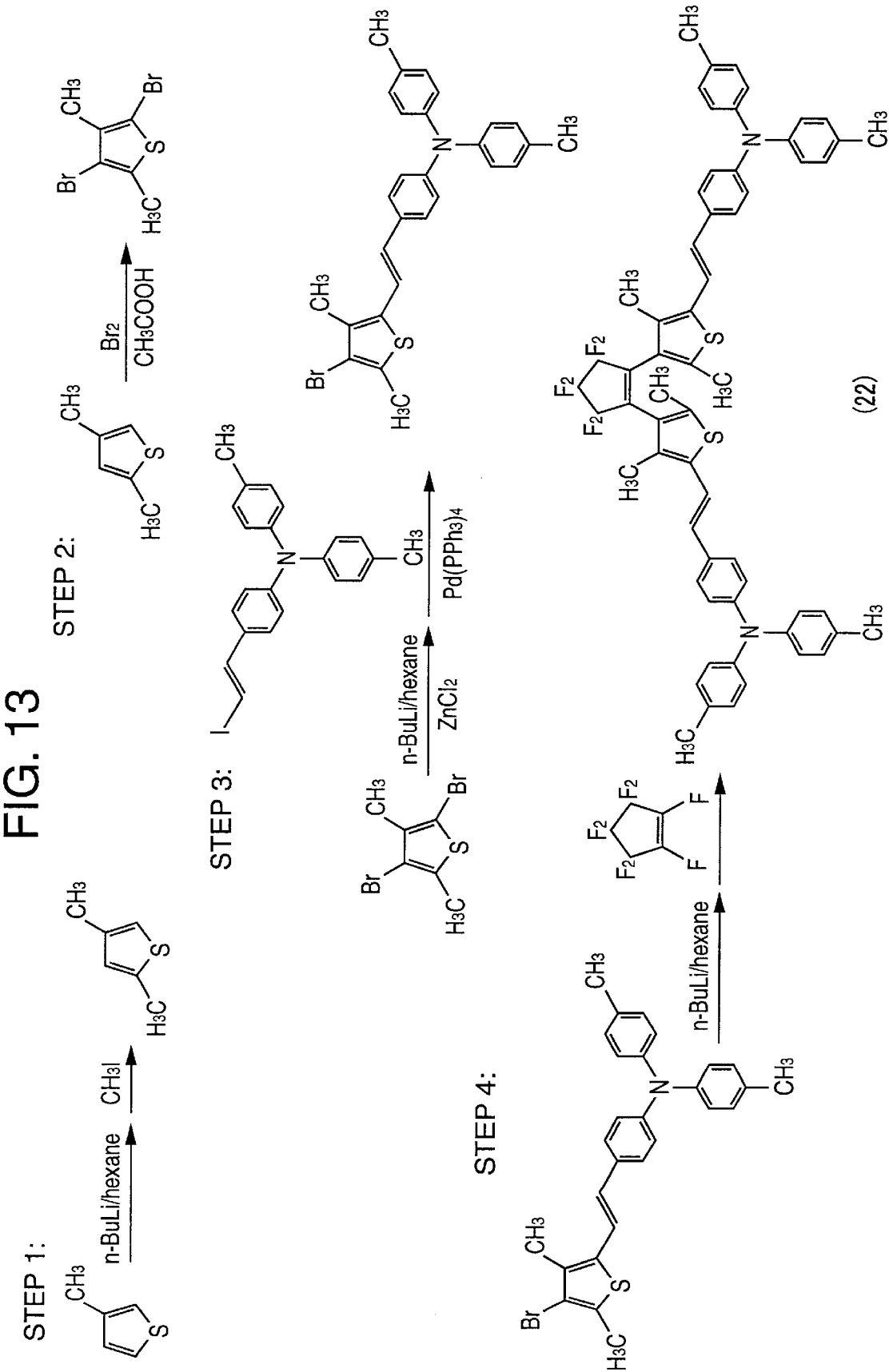
FIG. 13 is a reaction formula showing processes for synthesizing the photochromic compound in practical example 2.

A photochromic compound having triphenylamine and conjugated double bond is synthesized according to reactions shown in FIG. 13. (1) Step 1: 2,4-dimethylthiophene was synthesized in the same way as step 1 of practical example 1.

(2) Step 2: synthesis of 2,4-dibromo-3,5-dimethylthiophene 11.2 g (0.1 mole) of the 2,4-dimethylthiophene obtained in step 1 and 400 ml of acetic acid were put into a 500 ml three-neck flask, and 32 g (0.2 mole) of bromine was dropped thereto at room temperature with being stirred. After a 20-hour stirring at room temperature, the mixture was neutralized by sodium thiosulfate and sodium carbonate. Then, the obtained solution was extracted by ether. The organic phase (i.e. the ether phase) was washed with water, and subsequently dried by magnesium sulfate anhydride. The used magnesium sulfate was removed with a glass filter, and then the solvent was removed in vacuo. The obtained liquid was purified with silica gel column-chromatography and distilled in vacuo, thereby obtaining a bleached liquid of 2,4-dibromo-3,5-dimethylthiophene. (3) Step 3: synthesis of 3-bromo-2,4-dimethyl-5-(4-(N,N'-bis(4-methylphenyl)amino) phenylethenylthiophene 54.2 g (0.2 mole) of the 2,4-dibromo-3,5-dimethylthiophen obtained in the prior step, 200 ml of dry ethylether, 22.5 g (0.22 mole) of TMEDA were mixed in a 500 ml three-neck flask. Then 157 ml n-butyl lithium /hexane solution (1.4 mole/l) was added to the mixture with being stirred at room temperature, followed by further stirring for two hours at room temperature. After two-hour stirring, 200 ml of zinc chloride/ether solution (0.2 mole of zinc chloride) was added to the resultant solution, followed by further stirring for five hours at room temperature. The obtained solution was referred to as reaction solution B.

Into another 500 ml three-neck flask, 85 g (0.2 mole) of iodide, 2.31 g of tetrakis(triphenylphosphine) palladium and 200 ml of dry tetrahydrofuran were put. Then the reaction solution was stirred for four hours at room temperature. After the four-hour stirring, the reaction solution was dropped by reaction solution B, which has been prepared as explained above, at room temperature. Thereafter, this reaction system was heated to 50° C., followed by stirring for fifteen hours at 50° C.

After the stirring, the obtained solution was separated into an organic phase and a water phase by adding water. Then the water phase was extracted by ether. The organic phase was washed with dilute hydrochloric acid and with water, and subsequently dried by magnesium sulfate anhydride. The used magnesium sulfate was removed with a glass filter, and then the solvent was removed in vacuo. The obtained liquid was purified with silica gel column-chromatography and distilled in vacuo, thereby obtaining a bleached liquid of 3-bromo-2,4-dimethyl-5-(4-(N,N'-bis(4-methylphenyl) amino)phenylethenylthiophene.

(4) Step 4: synthesis of photochromic compound (formula (22) in FIG. 13)

The objective photochromic compound was synthesized in the same way as step 4 of practical example 1 except that 41.93 g (0.07 mole) of 3-bromo-2,4-dimethyl-5-(4-(N,N'-bis(4-methylphenyl)amino)phenylethenylthiophene obtained in step 3 of this practical example was used instead of 3-iodo-2,4-dimethyl-5-(4-(N,N'-bis(4-methylphenyl) amino)phenyl)thiophene, the amount of perfluorocyclopentene was 4.03 ml (0.03 mole), and the stirring was performed on a condition of 0° C. for seven hours.

As to each of the obtained compounds in the above-mentioned steps, a structure analysis was performed by 1H-NMR, 13C-NMR, FT-IR and GC/MS. Consequently, it was proved that all of those compounds were found to be objective products.

[Characteristics of Photochromic Compound]

1. Optical absorption properties

Absorption spectra were measured on the obtained photochromic compound in hexane before and after the ultraviolet light irradiation. The results were shown in FIG. 14.

Figure 14:
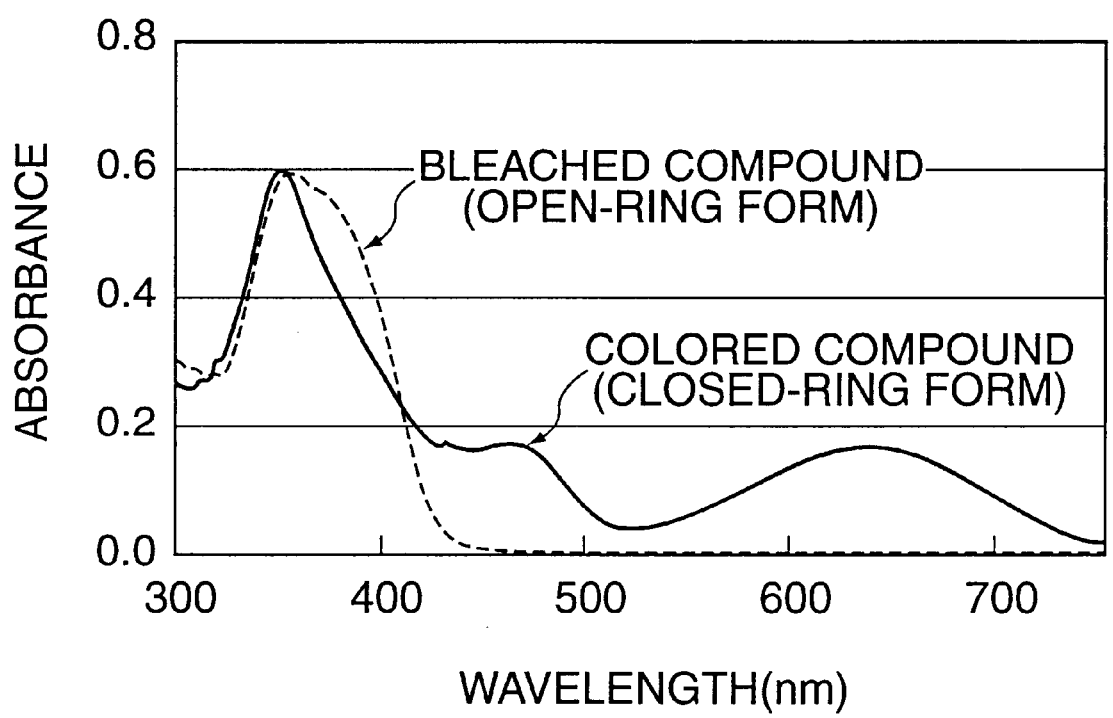
FIG. 14 is showing absorption spectral change of the photochromic compound in a liquid state obtained in practical example 2.

As shown in FIG. 14, the open-ring form of the compound had a maximum wavelength of 353 nm and the absorption band extended to 450 nm. Compared with the absorption spectra of the photochromic compound having no conjugated double bond between its diarylethene skeleton and a three aryls-contained group in practical example 1 (FIG. 8), the compound in this practical example had a longer absorption wavelength, which covered not only ultraviolet light but also blue light.

After the ultraviolet light irradiation, the solution containing the compound (closed-ring form) was colored and its maximum absorption was observed around 635 nm.

2. Photochromic reactions and stability of photochromic compound

The photochromic compound according to formula (22) exhibits isomerization reactions indicated as the following formulas. The ring-closing reaction occurs efficiently by irradiation of light of 400 nm, whereas the ring-opening reaction occurs efficiently by irradiation of light of 600 to 700 nm.

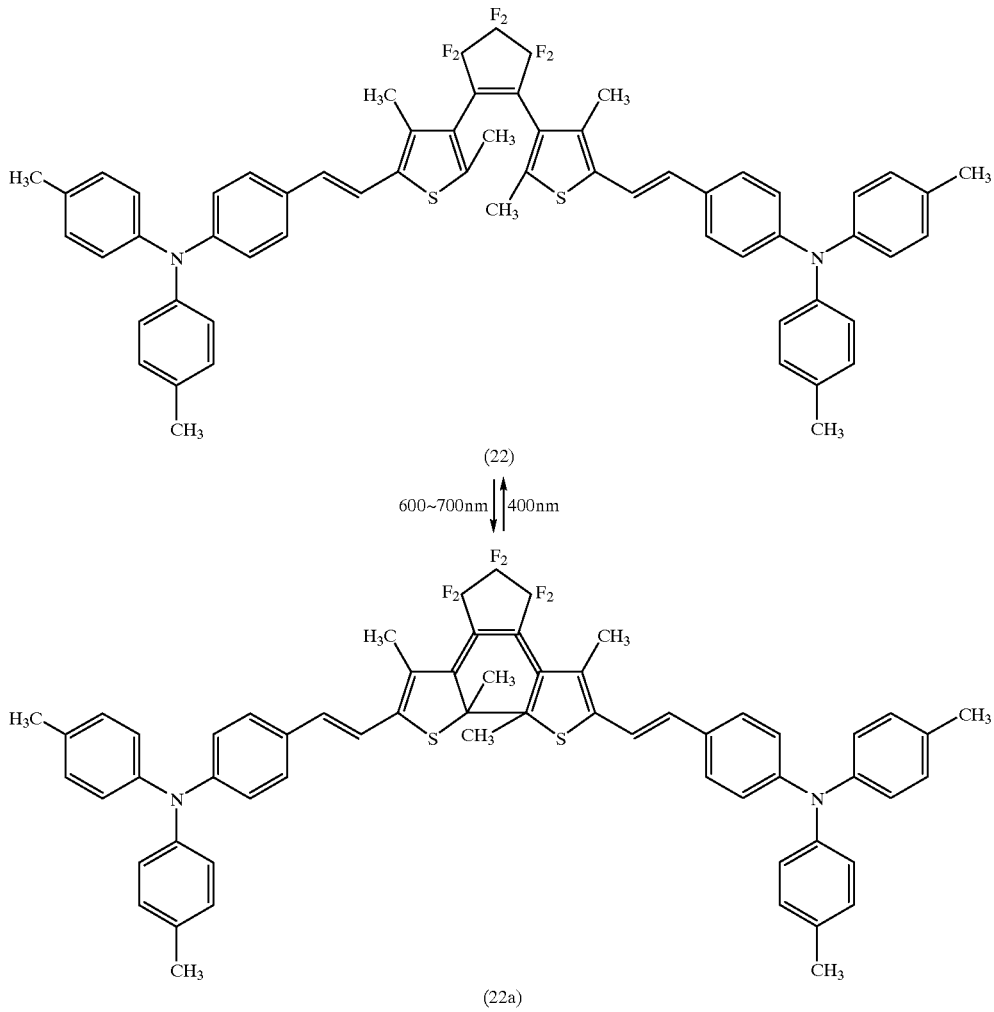

(22)

600~700nm ↕ 400nm (22a)

It was confirmed that a sample of open-ring form (22) melted to be an isotropic liquid at 200° C. and, by cooling the liquid to room temperature, it changed to be in a transparent and stable glass state. When the sample in the glass state was heated again, a glass transition phenomenon was observed at 106° C. This means that open-ring form (22) has a glass transition temperature of 106° C. So, it is considered to be sufficiently thermostable for practical use.

[Producing a Photochromic Compound Thin Film]

After the obtained photochromic compound (formula (22)) was dissolved into toluene, it was applied on a silica substrate by spin-coating method, followed by baking at 80° C., to produce a photochromic compound thin film (film thickness: 0.2 $\mu$m).

The obtained thin film was examined by x-ray diffraction and also by polarization microscope. Only a broad halo was observed in the x-ray diffraction measurement. And in the polarization microscope observation, the film was observed black because the light was not transmitted therethrough in the crossed nicols state. These results revealed that this thin film was a homogeneous amorphous film.

[Characteristics of Thin Film]

1. Durability

It was found that, even after the thin film was left more than three months, it hardly had a defect due to the crystallization and, therefore, it did not have deteriorated properties. This meant the thin film of the present invention had an excellent durability, when compared with a general organic thin film, which is more likely to be crystallized and, if it was left for a long period, is crystallized easier and the crystallized part forms a defect to decrease the thin film properties.

Even after leaving the thin film for 900 hours at 80° C. in the dark, the optical properties of the thin film remained unchanged.

Also after repeating the photochromic reactions for ten thousand times or more, the properties of the thin film hardly deteriorated.

2. Refractive index

As to the obtained photochromic thin film, the change of refractive index between before and after the ultraviolet light irradiation was examined. As a result, the difference of refractive index between before the light irradiation and in the photo-stationary state was $6 \times 10^{-2}$. Similarly to practical example 1, the refractive index difference was larger than that of the conventional photochromic compound dispersed-type thin film.

[Manufacturing an Optical Recording Device]

P1-type optical recording device:

P1-type optical recording device P1 was manufactured by: using a polycarbonate plate as substrate 1; applying the photochromic compound in practical example 2 on the substrate as a recording layer by spin coating method;

depositing a reflecting layer on the photochromic compound; and further forming a protective layer made of acrylic resin on the reflecting layer.

Optical recording device P1 was mounted on an equipment whose pickup was loaded with a semiconductor laser (wavelength: 400 and 680 nm). Then, the evaluations of recording and reading were made.

In the evaluations, for recording information, a laser of 400 nm in wavelength and 10 mW in intensity irradiated to the device to isomerize the photochromic compound of the recording layer. Thereafter, for reading the recorded information, a laser of 680 nm in wavelength and 0.2 mW in intensity irradiated to the device to measure the intensity of the reflected light. As a result, a read signal having a high C/N ratio of 50 dB or more was obtained.

P3-type optical recording device:

P3-type optical recording device P3 was made by forming the photochromic compound in practical example 2 on a polycarbonate substrate.

The recording device was arranged in the optical system shown in FIG. 4, then He-Cd laser (wavelength: 442 nm) was irradiated for the isomerization of the compound included in the recording layer, to record information. Then, a semiconductor laser (wavelength: 830 nm) was irradiated for measuring the refractive index of the transmitted light. The difference between the obtained refractive index and the initial refractive index (i. e., refractive index before recording) was read, to read the recorded information.

Practical Example 3

Tetraphenylmethylene photochromic compound
[Synthesis of Tetraphenylmethylene Photochromic Compound]

Figure 15:
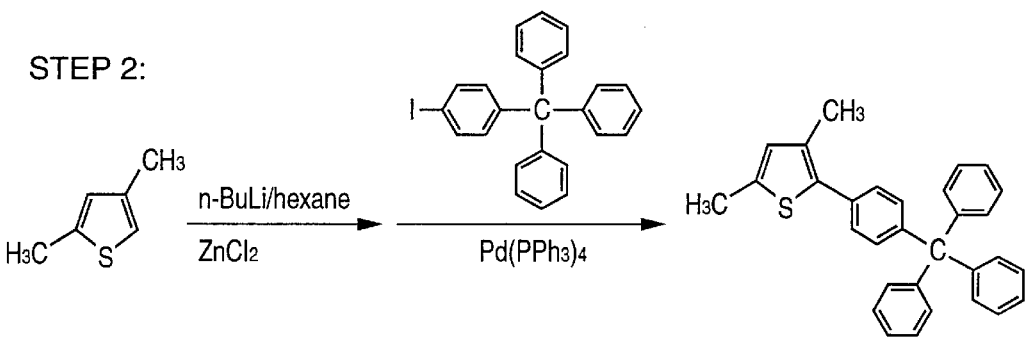
FIG. 15 is a reaction formula showing processes for synthesizing the photochromic compound in practical example 3.
Figure 15:
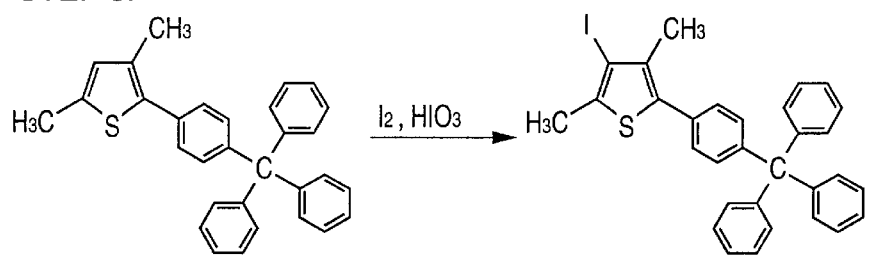
Figure 15:
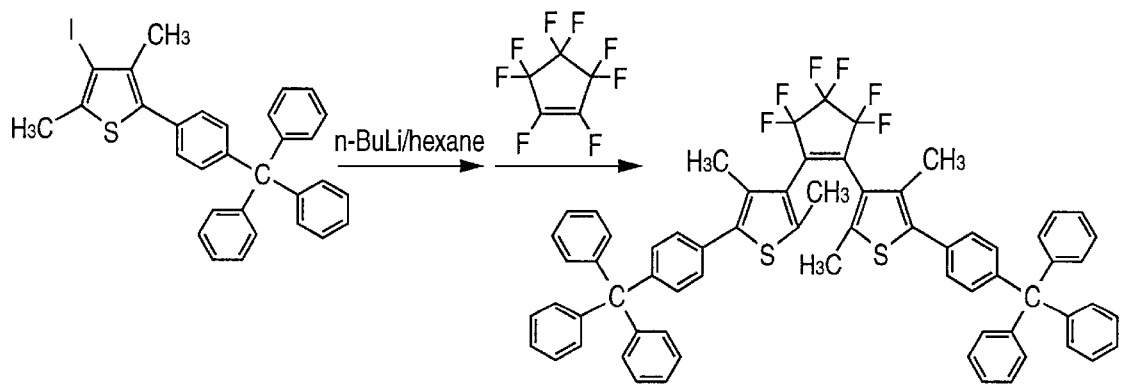

A tetraphenylmethylene photochromic compound is synthesized according to steps shown in FIG. 15.

(1) Step 1(not shown): Synthesis of 2,4-dimethylthiophene 2,4-dimethylthiophene was synthesized in the same way as step 1 of practical example 1.

(2) Step 2: synthesis of 2,4-dimethyl-5-(4-(tryphenylmethyl)phenyl)thiophene

The objective bleached liquid of 2,4-dimethyl-5-(4-(tryphenylmethyl)phenyl)thiophene was synthesized in the same way as step 2 of practical example 1 except for using 89.2 g (0.2 mole) of 4-iodo-tetraphenylmethane instead of 4-iodo-4',4"-dimethyltriphenylamine.

(3) Step 3: synthesis of 3-iodo-2,4-dimethyl-5-(4-(triphenylmethyl)phenyl)thiophene The objective bleached liquid of 3-iodo-2,4-dimethyl-5-(4-(triphenylmethyl)phenyl)thiophene was synthesized in the same way as step 3 of practical example 1 except for using 43.0 g (0.1 mole) of 2,4-dimethyl-5-(4-(triphenylmethyl)phenyl)thiophene instead of 2,4-dimethyl-5-(4-(N,N'-bis(4-methylphenyl)amino)phenyl)thiophene.

(4) Step 4: synthesis of photochromic compound (formula (23) in FIG. 14)

The objective photochromic compound was synthesized in the same way as step 4 of practical example 1 except that 38.92 g (0.07 mole) of 3-iodo-2,4-dimethyl-5-(4-(triphenylmethyl)phenyl)thiophene obtained in step 3 of this practical example was used instead of 3-iodo-2,4-dimethyl-5-(4-(N,N'-bis(4-methylphenyl)amino)phenyl)thiophene, the amount of perfluorocyclopentene was 2.35 ml (0.0175 mole), and the stirring was performed on a condition of 0° C. for seven hours.

As to each of the obtained compounds in the above-mentioned respective step, a structure analysis was performed by 1H-NMR, 13C-NMR, FT-IR and GC/MS. The results revealed all of those compounds were objective products.

[Characteristics of Photochromic Compound]

1. Optical absorption properties

Absorption spectra were measured on the obtained photochromic compound (formula (23)). As a result, it had maximum wavelengths of 260 and 330 nm. After the irradiation of ultraviolet light of 313 nm in wavelength, the solution containing the open-ring form (formula (23)) was colored and its maximum absorption was observed around 610 nm.

2. Photochromic reaction and stability of photochromic compound

It was confirmed that the photochromic compound according to formula (23) exhibits the reversible isomerization reaction shown as the following formulas.

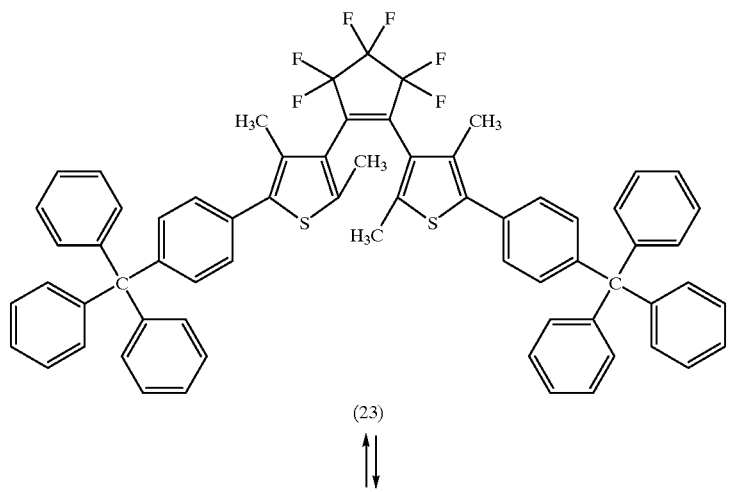

(23)

-continued

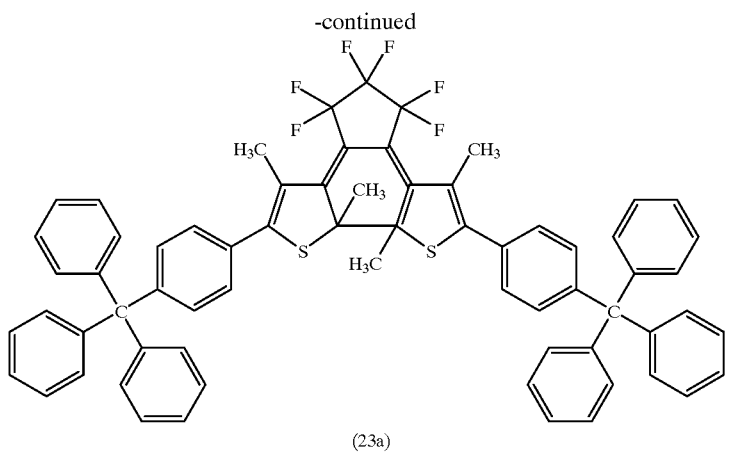

(23a)

It was found that the crystal of the open-ring form obtained through re-crystallization melted to be an isotropic liquid at 265° C. and, by cooling the liquid to room temperature, it changed to be in a transparent and stable glass state. When the compound in the glass state was heated again, a glass transition phenomenon was observed at 110° C.

[Producing a Photochromic Compound Thin Film]

After the obtained photochromic compound (formula (23)) was dissolved into toluene, it was applied on the silica substrate by spin-coating method, followed by baking at 80° C., to produce a thin film of photochromic compound (film thickness: 0.2 μm).

The obtained thin film was examined by x-ray diffraction and also by polarization microscope. Only a broad halo was observed in the x-ray diffraction measurement. And in the polarization microscope observation, the film was observed black because the light was not transmitted therethrough in the crossed nicols state. Consequently, it was proved that this thin film was a homogeneous amorphous film.

In order to compare with this thin film, a dispersed-type thin film (film thickness: 0.2 μm) of the photochromic compound in this practical example was also produced (this is referred to as comparative example 3 hereafter). To produce the comparative thin film, used was a dispersion liquid where 30 parts by weight of the photochromic compound was dispersed in 100 parts by weight of PMMA, and the dispersion liquid was applied to the substrate by spin-coating method, similarly to the thin film in practical example 3.

As to the dispersed-type thin film, it was confirmed that the compound contained in the comparative thin film also exhibits light-reversible isomerization reactions.

[Characteristics of Thin Film]

1. Durability

Even if the thin film in practical example 3 was left more than three months, the crystallization hardly proceeded therein. This proved that the thin film was a homogeneous amorphous film.

2. Optical absorption properties

Figure 16:
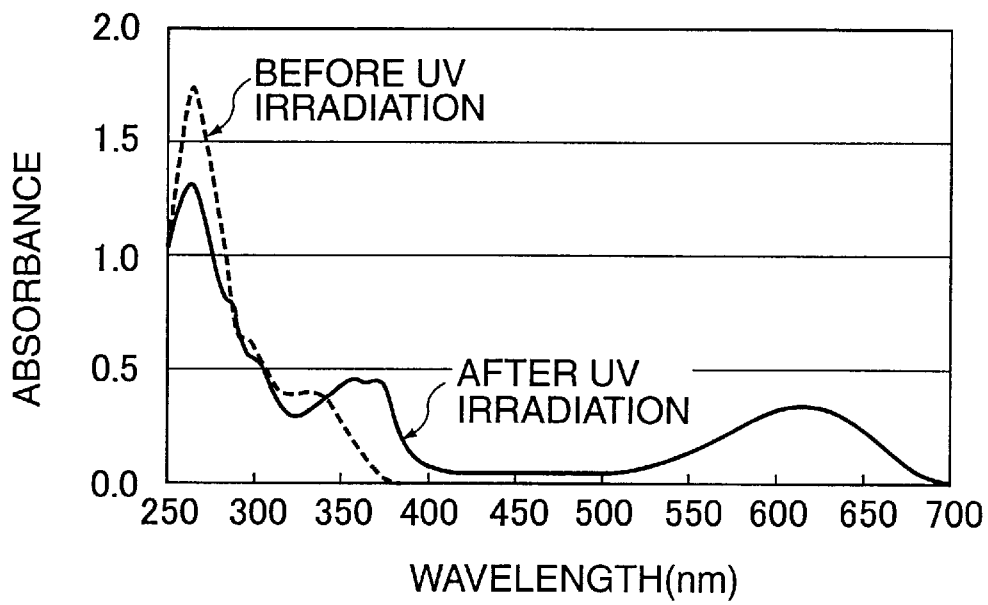
FIGS. 16 and 17 are respectively showing absorption spectral changes of the photochromic compound thin films obtained in practical example 3 and comparative example 3.
Figure 17:
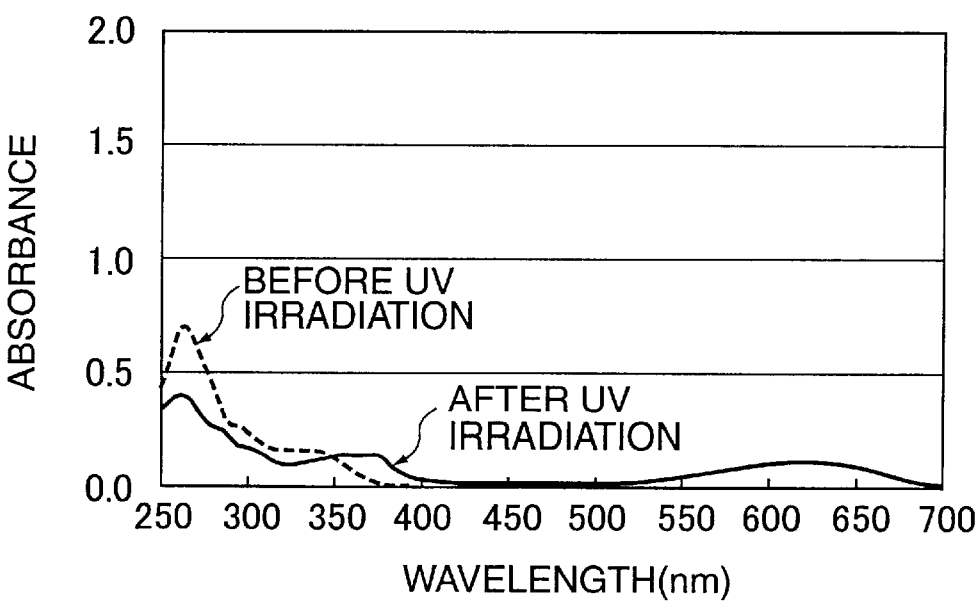

Absorption spectra were measured on the obtained bleached photochromic compound (open-ring form) thin films before and after the irradiation of ultraviolet light of 313 nm. The results on the thin films obtained in practical example 3 and comparative example 3 were shown in FIGS. 16 and 17, respectively. As shown in FIG. 16, the thin film before the ultraviolet light irradiation exhibited a maximum absorption at 310 nm. The thin film after the ultraviolet light irradiation exhibited a further absorption peak at 616 nm.

The 313 nm ultraviolet light was irradiated until the thin film reached the photo-stationary state, and then absorbance at 610 nm was measured. Also, examined was the rate of increase of the obtained absorbance to the initial absorbance before the ultraviolet light irradiation. As a result, the thin film of practical example 3 exhibited about three times as large absorbance change as comparative example 3 (i.e., a dispersed-type thin film). The reason is considered to be as follows. The amorphous thin film in practical example 3 can contain more amount of the photochromic compound than the conventional dispersed-type thin film, if these films have the same thickness. Thus, the thin film in practical example 3 is able to exhibit the optical properties derived from the photochromic compound more efficiently.

3. Refractive index

To the bleached (open-ring form) thin films of practical example 3 and comparative example 3, ultraviolet light (He-Ne laser) was irradiated to examine the relation between ultraviolet light irradiation time and refractive index change of the thin film. The results were shown in FIG. 18.

Figure 18:
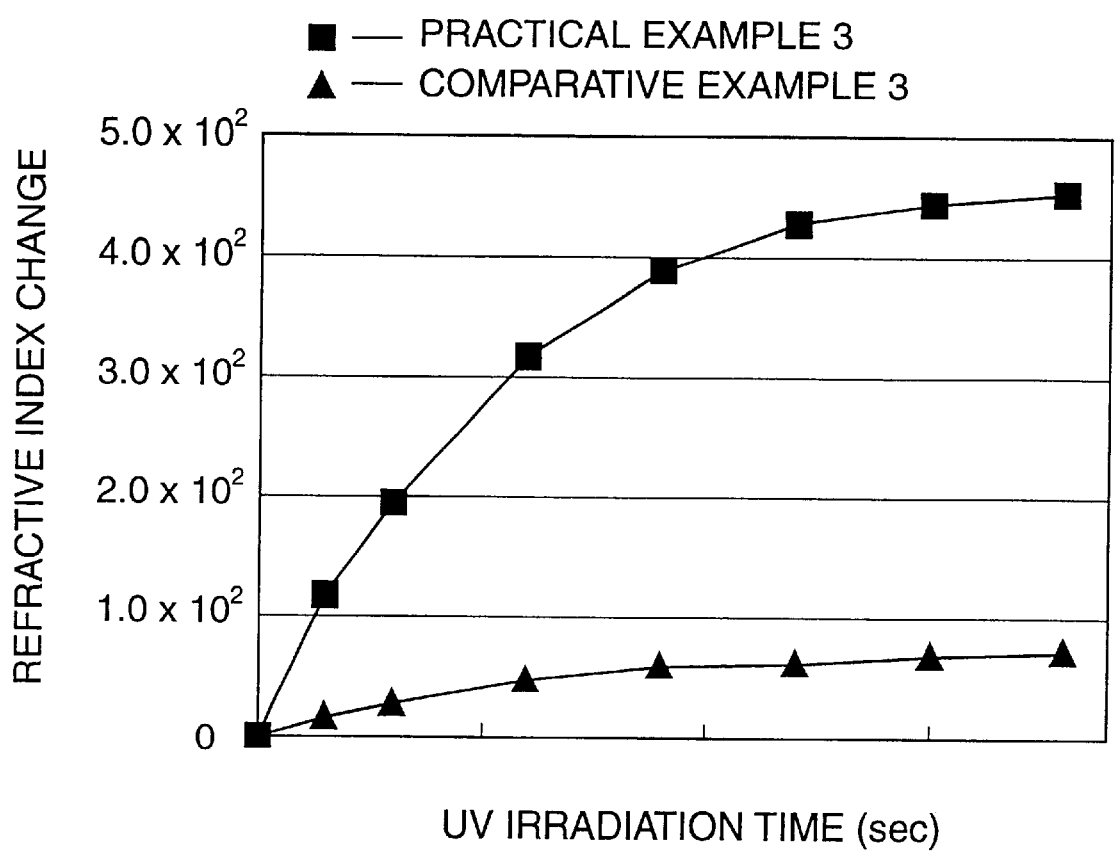
FIG. 18 is a graph showing relations between ultraviolet light irradiation time and change of refractive index of the thin films in practical example 3 and comparative example 3.

As shown in FIG. 18, the refractive index difference of the thin film of practical example 3 between before the ultraviolet light irradiation (i.e., at 0 time) and after the ultraviolet light irradiation (i.e., in the photo- stationary state) was $5\times10^{-2}$, whereas that of the thin film of comparative example 3 was $7\times10^{-3}$. The reason was considered as follows. Since the thin film of practical example 3 was an amorphous thin film made of the photochromic compound by itself, the refractive index was changed more remarkably based on the change of photochromic molecule structure by the light irradiation than that of the PMMA-dispersed thin film of comparative example 3.

[Manufacturing an Optical Recording Device]

P1-type optical recording device:

P1-type optical recording device P1 was manufactured by: providing the photochromic compound thin film in practical example 3 on a polycarbonate translucent substrate; further providing an Al-made reflecting layer on the thin film; and further forming a protective layer made of acrylic resin on the reflecting layer.

The ultraviolet light was irradiated over optical recording device P1 to let the photochromic compound contained in the recording layer be in a colored-state, to initialize it. Subsequently, optical recording device P1 was mounted on an equipment whose pickup was loaded with a semiconductor laser (wavelength: 680 nm). Then, the evaluations of recording and reading were made.

In the evaluation, for recording information, a laser of 680 nm in wavelength and 10 mW in intensity irradiated to the device to isomerize the photochromic compound of the recording layer. Thereafter, for reading the recorded information, a laser having the same wavelength as that for recording and having decreased intensity irradiated to the device to measure the intensity of the reflected light. As a result, a read signal having a high C/N ratio of 50 dB or more was obtained.

P3-type optical recording device:

P3-type optical recording device P3 was made by providing the photochromic compound thin film in practical example 3 on a polycarbonate translucent substrate. The obtained optical recording device was arranged to the optical system shown in FIG. 4, and then Ar laser (wavelength: 363 nm) irradiated to the system to record information. The recorded information could be read based on the refractive index difference, which was measured by semiconductor laser (wavelength: 830 nm).

What is claimed is:

1. A diarylethene photochromic compound represented by the following formula (1) or (2), wherein $R^5$ and $R^6$ are each organic groups having a carbon or nitrogen atom having a valence of 3 or 4 with 3 aryl groups or three aryl groups and an atomic group having a conjugated double bond bound between three aryls-contained groups and ring B or ring C:

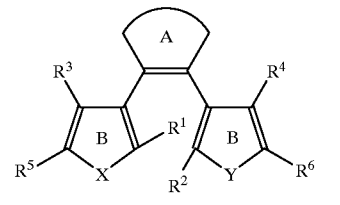

(1)

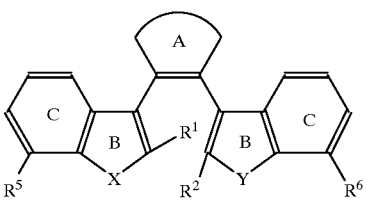

(2)

in which ring B is a hetero ring selected from a group consisting of furan, thiophene and pyrrole; ring A is at least one selected from a group consisting of alicyclic group, aromatic ring, maleic anhydride and maleimide group; ring C is a benzene ring or a substituted benzene ring; $R^1$ and $R^2$ are each one selected from a group consisting of hydrogen atom and an alkyl group having 1 to 6 carbon atoms, and they may be same or different from each other; and $R^3$ and $R^4$ are each one selected from a group consisting of hydrogen atom, an alkyl group having 1 to 6 carbon atoms, cyano group aryl group, halogen atom, nitro group, amino group and alkoxyl group, and they may be same or different from each other.

2. A photochromic compound according to claim 1, wherein $R^5$ and $R^6$ are each diarylaminoaryl group represented by the following formulas:

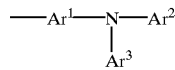

in which $Ar^1$, $Ar^2$ and $Ar^3$ are each one selected from a group consisting of benzene ring, substituted benzene ring, condensed ring, substituted condensed ring, hetero ring, and substituted hetero ring and they may be same or different.

3. A photochromic compound according to claim 1, wherein $R^5$ and $R^6$ are each triarylmethylenephenylene group represented by the represented by the following formulas:

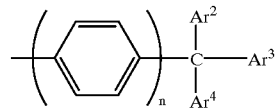

in which n denotes an interger of 1 or 2; $Ar^2$, $Ar^3$ and $Ar^4$ are each one selected from a group consisting of benzene ring, substituted benzene ring, condensed ring, substituted condensed ring, hetero ring and substituted hetero ring and they may be same or different.

4. A photochromic compound according to claim 1, wherein $R^5$ and $R^6$ are each group containing three aryls represented by the following formulas:

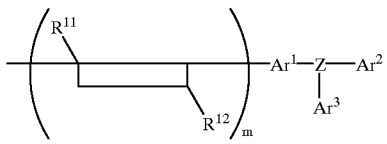

in which $Ar^1$, $Ar^2$ and $Ar^3$ are each one selected from a group consisting of benzene ring, substituted benzene ring, condensed ring, substituted condensed ring, hetero ring and substituted hetero ring and they may be same or different; m denotes an integer of 1 or 2; $R^{11}$ and $R^{12}$ are each one selected from a group consisting of hydrogen atom and an alkyl group having 1 to 6 carbon atoms and they may be same or different from each other; and Z is an element selected from the group consisting of nitrogen and phosphorus.

5. A photochromic compound according to claim 4, wherein Z represents nitrogen atom.

6. A photochromic compound according to claim 1, wherein $R^5$ and $R^6$ are each group containing three aryls represented by the following formulas:

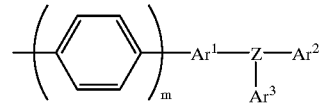

in which $Ar^1$, $Ar^2$ and $Ar^3$ are each one selected from a group consisting of benzene ring, substituted benzene ring, condensed ring, substituted condensed ring, hetero ring and substituted hetero ring and they may be same or different; m denotes an integer of 1 or 2; and Z is an element selected from the group consisting of nitrogen and phosphorus.

7. A photochromic compound according to claim 1, wherein ring A represents perfluorocyclopentylidene.

8. A photochromic compound according to claim 1, wherein ring B represents thiophene.

* * * * *